(12) United States Patent
Park et al.

(10) Patent No.: US 7,736,042 B2
(45) Date of Patent: Jun. 15, 2010

(54) BACK LIGHT UNIT

(75) Inventors: Deuk Il Park, Suwon-si (KR); Choong Yop Rhew, Suwon-si (KR); Ki Yong Balk, Yongin-si (KR); Young Jin Hyun, Hwaseong-si (KR); Jun Kyu Lee, Suwon-si (KR); Hyun Jung Cho, Cheongju-si (KR); Kyu Jin Choi, Busan (KR)

(73) Assignee: LS Tech Co., Ltd., Pyeongtaek (KR)

( * ) Notice: Subject to any disclaimer, the term of this patent is extended or adjusted under 35 U.S.C. 154(b) by 226 days.

(21) Appl. No.: 11/708,054

(22) Filed: Feb. 20, 2007

(65) Prior Publication Data

US 2008/0019115 A1 Jan. 24, 2008

(30) Foreign Application Priority Data

Oct. 9, 2006 (KR) ............... 10-2006-0097960

(51) Int. Cl.
*F21V 7/04* (2006.01)
(52) U.S. Cl. .................. 362/602; 362/29; 362/800; 362/24; 362/28; 362/86; 362/625; 362/26; 362/614; 362/629
(58) Field of Classification Search .......... 362/602, 362/29, 800, 24, 28, 86, 625, 26, 27, 30, 362/85, 604, 612, 614, 623, 626, 629, 812
See application file for complete search history.

(56) References Cited

U.S. PATENT DOCUMENTS

| | | | | |
|---|---|---|---|---|
| 5,207,493 A | * | 5/1993 | Murase et al. | 362/623 |
| 6,300,940 B1 | * | 10/2001 | Ebina et al. | 345/161 |
| 7,181,251 B2 | * | 2/2007 | Stohr et al. | 455/566 |
| 7,364,337 B2 | * | 4/2008 | Park | 362/602 |

FOREIGN PATENT DOCUMENTS

| | | |
|---|---|---|
| JP | 09-274183 | 10/1997 |
| JP | 2001-135193 | 5/2001 |
| JP | 2002-077968 | 3/2002 |
| JP | 2003-087388 | 3/2003 |
| JP | 2004-071258 | 3/2004 |
| JP | 2004-186055 | 7/2004 |
| JP | 2004-199964 | 7/2004 |
| JP | 2004-295187 | 10/2004 |
| KR | 20-1998-034575 A | 5/1998 |

(Continued)

*Primary Examiner*—Sandra L O'Shea
*Assistant Examiner*—Jessica L McMillan
(74) *Attorney, Agent, or Firm*—John K. Park; Park Law Firm

(57) ABSTRACT

Provided is a back light unit. The back light unit includes a light guide plate having a light guide pattern part; at least one light emitting unit provided at a sidewall of the light guide plate, and irradiating light to the light guide plate; a keypad positioned over the light guide plate, and comprising a resin layer, a base resin layer, a character opening part having a character shape, a key assembly provided at one side, and a key adherence film provided on an upper surface of the base resin layer; and a printed circuit board comprising a metal dome switch positioned under a lower surface of the light guide plate.

61 Claims, 22 Drawing Sheets

FOREIGN PATENT DOCUMENTS

| | | |
|---|---|---|
| KR | 10-2000-0009556 A | 2/2000 |
| KR | 10-0270881 B1 | 8/2000 |
| KR | 10-2001-0039294 A | 5/2001 |
| KR | 10-2002-0032677 A | 5/2002 |
| KR | 10-2003-0042723 A | 6/2003 |

* cited by examiner

BACK LIGHT UNIT

BACKGROUND OF THE INVENTION

1. Field of the Invention

The present invention relates to a keypad apparatus for an input device having a backlighting function, such as a mobile phone, a telephone, a Portable Digital Assistant (PDA), a keyboard, or a calculator, and more particularly, to a back light unit for a keypad apparatus, having an easy bending property, flexibility, and optimal transmittance and preventing light leakage at an edge.

2. Description of the Related Art

A light receiving type flat panel display such as a liquid crystal display (LCD), a keypad back light unit for a telephone or a mobile phone, or a back light unit for a lighting signboard has been disclosed in Korean Patent Application Nos. 10-1997-0073783, 10-1998-0030060, 10-1999-0047621, 10-2000-0063111, 10-2001-0073468, 10-2005-0062790, and 10-2005-0062797, and Korean Utility Model Application No. 20-1996-0047524. The above key backlighting back light unit for an input device disclosed in the above inventions and utility model is of a type in which a plurality of light emitting diodes (LED) are disposed at each required part of the back of a key, and locally emit light only to each required part. Alternately, the key backlighting back light unit is of an edge light type in which a light emitting plate such as an organic light emitting diode (OLED) is provided or an LED light source is provided at an edge of a flexible thin silicon plate used as a light guide plate, and irradiates light to the required part.

The back light unit of the type in which the plurality of LEDs are directly disposed at the back of the key has a drawback that a manufacture cost increases because the LEDs are required as many as the number of the keys, and an amount of power consumption increases.

As a solution to this problem, there has been provided a method in which an LED is not provided every key but is suitably disposed in space between keys, thereby lighting two or three keys by one LED. However, this method has a serious disadvantage in which a product quality is deteriorated because a constant luminance is not provided as much as required every key, and a distribution of luminance between the keys is great. Also, this method requires still many LEDs smaller than the number of the keys.

The back light unit of the type in which a surface light emitting plate device such as the OLED in place of an LED is disposed on an upper surface of a contact switch and keys are again disposed on the upper surface thereof has drawbacks of deteriorating light efficiency of the device itself, increasing a manufacture cost of the OLED because of a great prime cost, additionally requiring a separate power supply using alternate current driving, causing a noise due to the alternate current driving, and increasing a cost for additional solutions thereto.

As a solution to the above drawbacks, there is provided an edge light type back light unit for an LCD panel including a transparent light guide plate for transmitting light and a light emitting unit disposed at an edge of the light guide plate. The edge light type back light unit is widely used because of its high efficiency and low price. However, the edge light type back light unit cannot be used as a key backlighting back light unit for an input device such as a telephone and a mobile phone because its light guide plate is of acrylic resin not almost bent. In detail, the key backlighting back light unit cannot be used for the edge light type back light unit because its keypad used for the telephone and the mobile phone should be flexible in its function and key pressing should result in pressing down of the keypad, thereby enabling a contact switch.

Thus, there is provided a method in which the light guide plate is of relatively flexible silicon in place of solid material, in order to use an edge light emitting type back light unit as the key backlighting back light unit for the input device.

However, this method causes another problem of deteriorating a product elasticity for bending and restoring the silicon light guide plate to an original state because of excessive flexibility, in case where the silicon light guide plate is manufactured as a thin film having a thickness of 1 mm or less. In particular, the silicon light guide plate is bent as mounted when there exists a bending part of the keypad such as a metal dome switch, thereby destroying a horizontal alignment of a light source and the light guide plate, and causing a loss of light incident on an end of the light guide plate. Also, there occurs a drawback that the bending of the light guide plate causes an increase of an amount of light incident at an angle of less than a critical angle for total reflection and not totally reflecting within the light guide plate, and thus causing light loss outside the light guide plate in course of light guide.

Silicon having relatively low interface energy easily forms an interface. Therefore, the silicon light guide plate is adhered to other parts upon keypad assembly, thereby making it difficult to minutely adjust and assemble the light guide plate in a regular position. The adhesion greatly occurs because the light guide plate is of a very small thickness and thus is easily bent.

In a conventional back light unit, a light source is disposed at any end of a light guide plate with a suitable light guide pattern. While incident light emitted from the light source travels within the light guide plate, light encounters the light guide pattern, effectively turns to the front, and radiates outside, thereby lighting the back of a key. Other light not encountering the light guide pattern totally reflects or transmits and disappears within the light guide plate. A large amount of light escapes from an edge of the light guide plate opposite to the light source. Thus, the conventional back light unit has a drawback that a product is greatly deteriorated in its appearance because light leaks out from an edge of the product.

In order to minimize light loss and prevent light leakage, an LCD back light unit improves light efficiency in such a manner that a reflection sheet is attached to an edge of a light guide plate at which a light source is not located, thereby enabling light to encounter and reflect from the reflection sheet and be again incident inside the light guide plate. However, a key backlighting back light unit has a great difficulty and thus has no possibility in attaching a reflection sheet to an external part of a light guide plate because the light guide plate has a very small thickness of less than 0.1 mm to 1 mm because of a product characteristic. The key backlighting back light unit is difficult to expect even the improvement of light efficiency because it cannot achieve an effect of perfect adherence to an edge. In other words, this drawback results in a loss of a large amount of light and therefore, causes a disadvantage that the number of light sources should increase by an amount of lost light to acquire a required amount of light.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a back light unit for a keypad of an input device, in which a light guide plate having a light guide pattern part based on a predetermined regularity can be of thin transparent resin having a predetermined hardness, for solving an assembly problem and a light loss problem caused by adhesion despite having flexibility and a transmittance property, thereby acquiring a minimum luminance required for a light source, and achieving a cost reduction, a slim design, and a minimization of power consumption.

Another aspect of exemplary embodiments of the present invention is to provide a keypad combination back light unit for an input device, in which a keypad can be integrated with a light guide plate that has an engraved or embossed light guide pattern part based on a predetermined regularity and is of thin transparent resin having a low adhesion and a predetermined hardness despite having flexibility and a transmittance property, thereby acquiring a minimum luminance required for a light source, and achieving a cost reduction, a slim design, and a minimization of power consumption.

A further another aspect of exemplary embodiments of the present invention is to provide a keypad combination back light unit for an input device, in which a light leakage prevention pattern can be separately provided by engraving at an edge of a light guide plate having a front light guide pattern layer, and can be provided with opaque material, thereby preventing light leakage, improving product appearance, acquiring a minimum luminance required for a light source, and achieving a cost reduction, a slim design, and a minimization of power consumption.

A yet another aspect of exemplary embodiments of the present invention is to provide a back light unit for a keypad and a keypad combination back light unit, in which a transparent protective layer can be coated on the keypad of the back light unit, thereby enhancing a durability of a character layer, complementing a hardness of a thin light guide plate, improving an assembly, and providing a solution to a problem caused by a hardness.

A still another aspect of exemplary embodiments of the present invention is to provide a keypad combination back light unit for an input device, in which a character layer including a display layer and a color layer, and a reflection layer can be integrally formed without an air layer between a light guide plate and each layer on an upper surface of the light guide plate, and the light guide plate can be of thin transparent resin having a low adhesion and a predetermined refractive index despite having flexibility, an elastic restoration property, and a transmittance property, thereby acquiring a minimum luminance required for a light source, and achieving a cost reduction, a slim design, and a minimization of power consumption.

A still another aspect of exemplary embodiments of the present invention is to provide a keypad combination back light unit for an input device, in which a character layer including a display layer and a color layer, and a reflection layer can be integrally formed without an air layer between a light guide plate and each layer on an upper surface of the light guide plate, and the light guide plate can be of thin transparent resin having a low adhesion and a predetermined refractive index despite having flexibility, an elastic restoration property, and a transmittance property, and a light leakage prevention pattern is separately formed by engraving on an edge of the light guide plate having a front light guide pattern layer and is provided with opaque material, thereby preventing light leakage, improving product appearance, acquiring a minimum luminance required for a light source, and achieving a cost reduction, a slim design, and a minimization of power consumption.

According to one aspect of exemplary embodiments of the present invention, there is provided a keypad apparatus. The keypad apparatus includes a light guide pattern part in which a plurality of engraving or embossing patterns based on a predetermined regularity are of shapes of a plurality of required characters, symbols, numerals or keys so that light can diffuse and scatter with a desired luminance using a minimum light source at a required light emitting region; a light guide plate being of transparent resin having predetermined physical properties to have a flexibility and an optimal transmittance; and at least one light emitting unit provided at a sidewall of the light guide plate.

The light guide plate may be of polyurethane based material having a hardness of 70 to 96.

According to another aspect of exemplary embodiments of the present invention, there is provided a keypad combination back light unit in a keypad apparatus. The back light unit includes a character layer having a plurality of keys; a light guide plate provided on a lower surface of the character layer, and having a light guide pattern part provided on its lower surface and having a protrusion part pressing down by pressing of an arbitrary key; at least one light emitting unit provided at a sidewall of the light guide plate, and irradiating light to the light guide plate; and a printed circuit board having a metal dome switch that is positioned under a lower surface of the light guide plate and is enabled by pressing-down of the light guide plate upon pressing of a predetermined key. The light guide plate satisfies a condition of Equation below:

$$H_{min}=60.5T^{-0.18}$$

where, $H_{min}$: minimum hardness of flexible transparent resin, and T: thickness of light guide plate (mm). A maximum hardness is 96 or less.

According to a further another aspect of exemplary embodiments of the present invention, there is provided a key backlighting back light unit. The back light unit includes a light guide plate being of transparent resin having flexibility, and having a light guide pattern part; at least one light emitting unit provided at a sidewall of the light guide plate, and irradiating light to the light guide plate; a keypad positioned over the light guide plate, and having a resin layer, a character opening part having a character shape, and a key assembly provided at one side; a printed circuit board having a metal dome switch positioned under a lower surface of the light guide plate; and a light leakage prevention pattern provided at an edge of the light guide plate opposite to the light emitting unit, and reflecting light irradiated from the light emitting unit and not encountering the light guide pattern part, and preventing light leakage outside the light guide plate.

The light leakage prevention pattern may additionally have opaque material.

According to a yet another aspect of exemplary embodiments of the present invention, there is provided a keypad combination back light unit. The back light unit includes a character layer having a plurality of keys; a light guide plate provided on a lower surface of the character layer, and having a light guide pattern part provided on its lower surface and having a protrusion part pressing down by pressing of an arbitrary key; at least one light emitting unit provided at a sidewall of the light guide plate, and irradiating light to the light guide plate; a printed circuit board having a metal dome switch positioned under the protrusion part, and enabled by the pressing down of the protrusion part by the pressing of the arbitrary key; and a light leakage prevention pattern for preventing light irradiated from the light emitting unit from being leaking to an opposite side of the light guide plate at an edge of the light guide plate opposite to the light emitting unit.

A transparent protective layer may be formed on an upper surface of the character layer to have a smaller thickness than the light guide plate.

The light leakage prevention pattern may additionally have opaque material.

According to a still another aspect of exemplary embodiments of the present invention, there is provided a back light unit. The back light unit includes a light guide plate of transparent resin having physical properties in which it is pressed down when a key is pressed, and restored to an original state when the key is released; at least one light emitting unit provided at a sidewall of the light guide plate, and emitting light; and a reflection layer provided at at least one side of an upper surface and a lower surface of the light guide plate. The light guide plate has a refractive index of 1.5 or more.

A light guide pattern having the refractive index of 1.5 or more is formed on a lower surface of the light guide plate.

A light leakage prevention pattern is formed by engraving at an edge of the light guide plate having the refractive index of 1.5 or more.

BRIEF DESCRIPTION OF THE DRAWINGS

The accompanying drawings, which are included to aid in The above and other objects, features and advantages of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF THE INVENTION

Exemplary embodiments of the present invention will now be described in detail with reference to the annexed drawings. In the following description, a detailed description of known functions and configurations incorporated herein has been omitted for conciseness.

Figure 1:
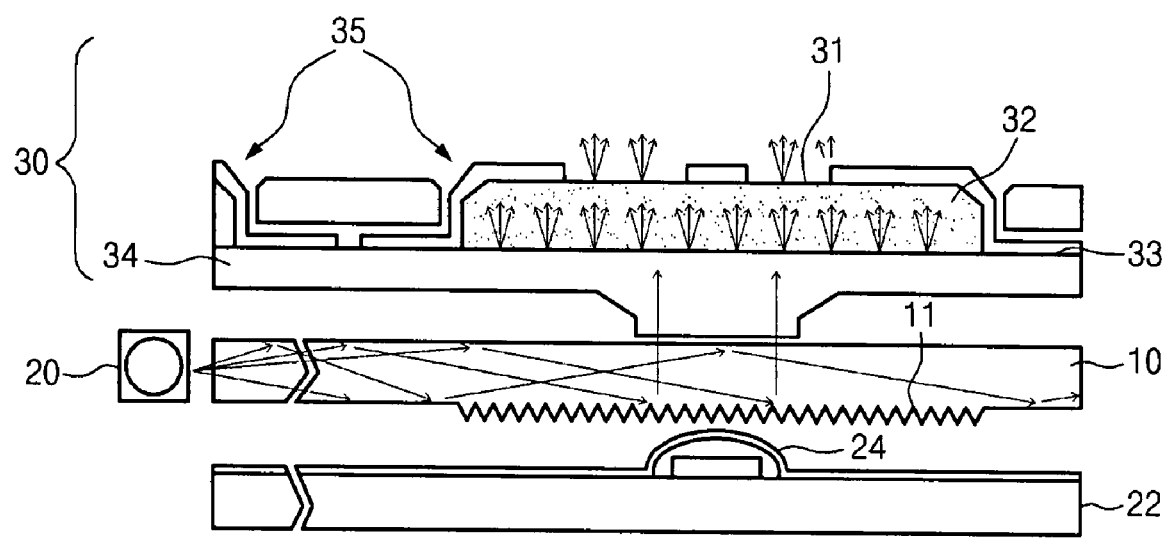
FIG. 1 is a schematic diagram illustrating a key backlighting back light unit according to the present invention.

FIG. 1 is a cross-sectional diagram illustrating a key backlighting back light unit according to the present invention. An input device for a telephone or a mobile phone includes a light guide plate 10 having a light guide pattern part 11 on its lower surface, and diffusing and scattering light with a uniform illuminance at a required light emitting region; at least one light emitting unit 20 provided at a sidewall of the light guide plate 10, and irradiating light to the light guide plate 10; a keypad 30 positioned over an upper surface of the light guide plate, and including a resin layer 32, a base resin layer 34, and a character opening part 31 having a character shape, a key assembly 35 provided at one side, and a key adhesion film 33 positioned on an upper surface of the base resin layer 34; and a Printed Circuit Board (PCB) 22 including a metal dome switch 24 positioned under the lower surface of the light guide plate 10.

The light emitting unit 20 mainly uses a light emitting diode (LED). The light guide plate 10 is required to have a property of material having great refractive index and transmittance to minimize a total reflection of light and an absorption loss within material, and being easily bent upon applying of an external force because of having elasticity despite having a predetermined hardness, and being easily restored to an original state from a bending state upon releasing of an external force because of having a sufficient elasticity. It is desirable to use high transparent silicon or polyurethane based material as resin having all the properties. It is desirable to use polyurethane based material sufficiently satisfying a required hardness by only itself in case where a separate hardness complementing method is not used.

The light guide pattern part 11 is formed on the lower surface of the light guide plate 10 to have an island shaped group with a predetermined regularity. The light guide pattern part 11 is formed to have engraving or embossing with predetermined shapes, e.g. dot, circle, straight line, dashed line, mesh patterned, and non-patterned shapes or a combination thereof. The island-like light guide pattern part 11 having a plurality of engraving or embossing is of a type of several required characters or keys. The light guide pattern part 11 is formed using printing, injection molding, extrusion, stamping, imprinting, ultrasonic processing, and laser processing methods.

In detail, the light guide pattern part 11 can be formed using various methods: the printing method using a mask having a light guide pattern formed by a separate ink, the injection molding -method using a patterned metal mold, the stamping -method using a heated stamp metal mold having a light guide pattern, the laser processing method where the light guide plate 10 is marked using a laser beam oscillated from a laser device, and the ultrasonic processing method using ultrasonic waves.

The light guide plate 10 should use a material having a transmittance as great as possible. The light guide plate 10 can apply a hardness differently depending on its thickness.

Conventional high transparent silicon has been already used as light guide plate material because of its chemical and physical stabilities. However, it has a property of easily adhering or sticking its upper and lower surfaces to other parts after keypad assembly because the silicon easily forms an interface due to its low interfacial energy.

Figure 2A:
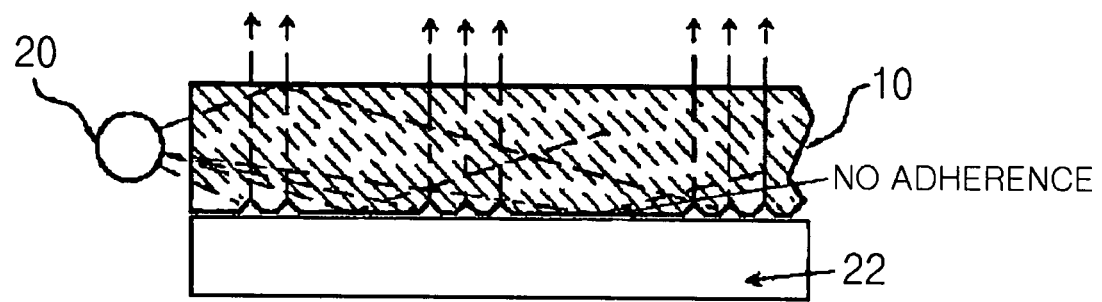
FIG. 2 is a schematic diagram illustrating an adhesion phenomenon of a light guide plate in a key backlighting back light unit according to the present invention.
Figure 2B:
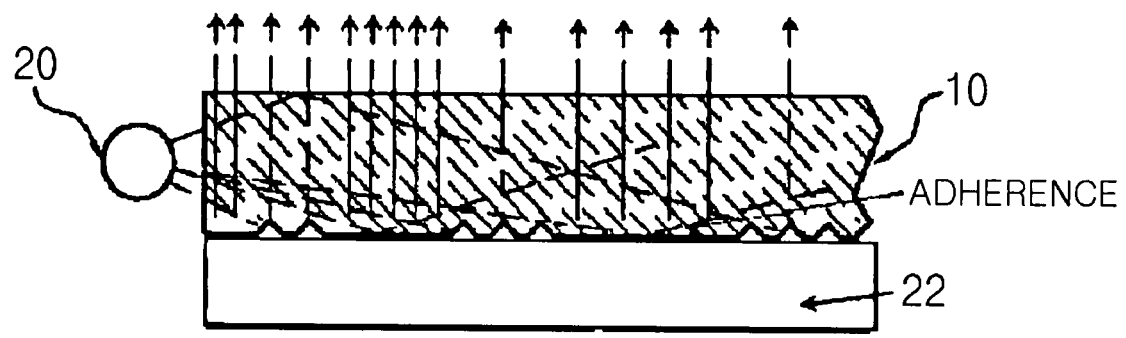

FIG. 2 illustrates a case where the silicon light guide plate 10 is adhered or stuck to another lower part, e.g., the PCB 22. As shown in FIG. 2A, before adhesion or sticking, light radiated from the light source 20 totally reflects while being guided on a contact surface between a primary medium, which is the light guide plate, and a secondary medium, which is air. As shown in FIG. 2B, after the adhesion or sticking, the secondary medium changes from the air to metal or resin. In detail, a refraction angle gets small because the secondary medium changes from the air to a medium having a greater absolute refractive index. As a result, a total reflection percentage of light gets low and thus, light transmits without total reflection, at an adhesion region outside the light guide plate, thereby causing undesired light emission. In other words, there occurs a drawback that light loss occurs at an arbitrary adhesion region, not at a required region.

High hardness is advantageous because reducing the adhesion or sticking. However, silicon is difficult to increase the hardness more than a predetermined level. The high transparent silicon gradually reduces in transmittance when the hardness is equal to or more than 60, and abruptly reduces in transmittance when the hardness is equal to about 70. Thus, it is difficult to use the light guide plate using only thin silicon without applying an additional hardness complementing method. An alternative to this is polyurethane. Polyurethane can keep transmittance while easily increasing the hardness owing to its greater interfacial energy and low adhesion. Thus, polyurethane has an advantage of minimizing material bending, adhesion, and sticking. This advantage makes it possible to design even a thin light guide plate.

Figure 3:
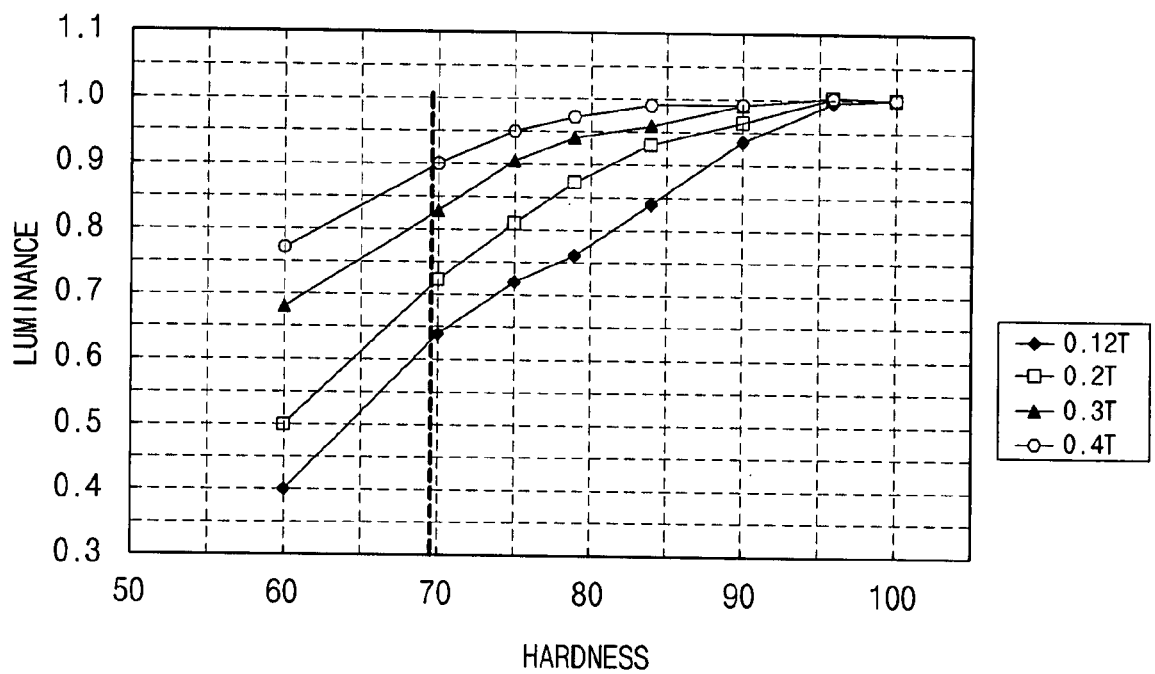
FIG. 3 is a graph of luminance versus hardness before key enabling in a light guide plate according to the present invention.

FIG. 3 is a graph illustrating an experimental result of a variation of luminance. The variation is measured on an upper surface of the keypad 30, and is substituted with an absolute value on the assumption that a maximum luminance value is equal to 1, when resin material varies in thickness within a range of about 0.12 mm to 0.4 mm by about 0.1 mm and varies in hardness within a range of about 60 to 100. In case where the light guide plate has a thickness of more than 0.4 mm, a thickness is too great in the keypad 30 for a mobile phone and thus, has a bad influence on a thin product design, thereby causing a difficulty in application. In case where the light guide plate has a thickness of less than 0.1 mm, there occurs a drawback that light incidence efficiency and transmittance are too low, thereby reducing an absolute luminance. Also, there is a drawback of having a difficulty in manufacturing the light guide plate at a uniform thickness.

As the experimental result, it can be appreciated that the luminance does not reduce even in the low hardness as material gets larger in thickness. It can be appreciated that the material has a thickness of 0.12 mm, the luminance value is stable when the hardness is more than 70.

Figure 4:
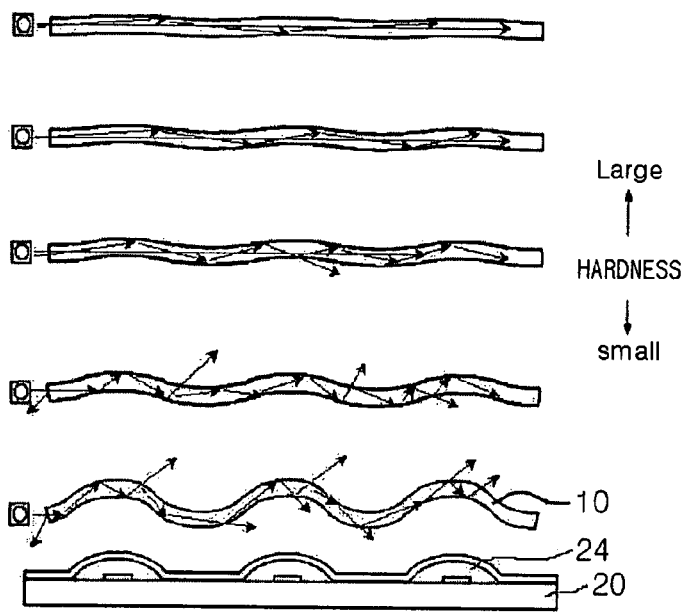
FIG. 4 is a schematic diagram illustrating luminance variation depending on hardness variation in a light guide plate according to the present invention.
Figure 5:
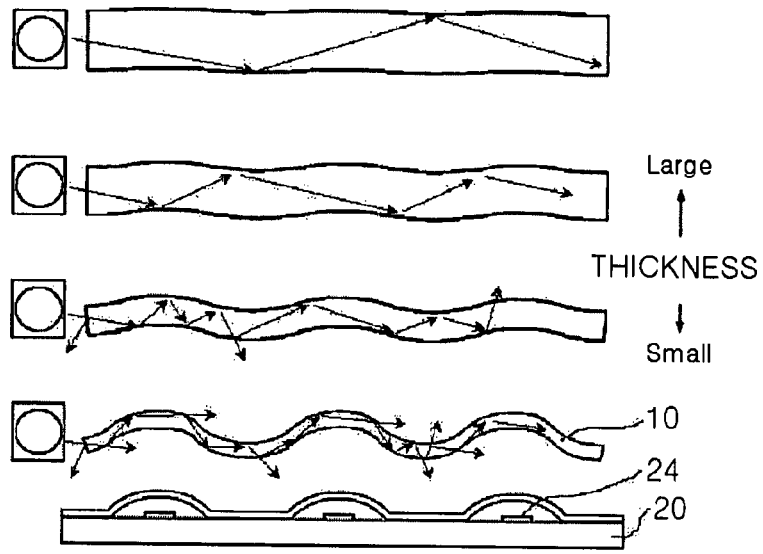
FIG. 5 is a schematic diagram illustrating a variation of luminance versus thickness in a light guide plate according to the present invention.

The reason can be easily presumed that the light guide plate of the same thickness is more easily bent as getting small in hardness, and is smaller in its light guide efficiency as getting bent, as shown in FIG. 4 illustrating bending of the light guide plate when the hardness varies at a thickness of 0.12 mm.

It can be appreciated that the light guide plate of the same hardness gets bent greater as getting small in thickness.

Figure 6:
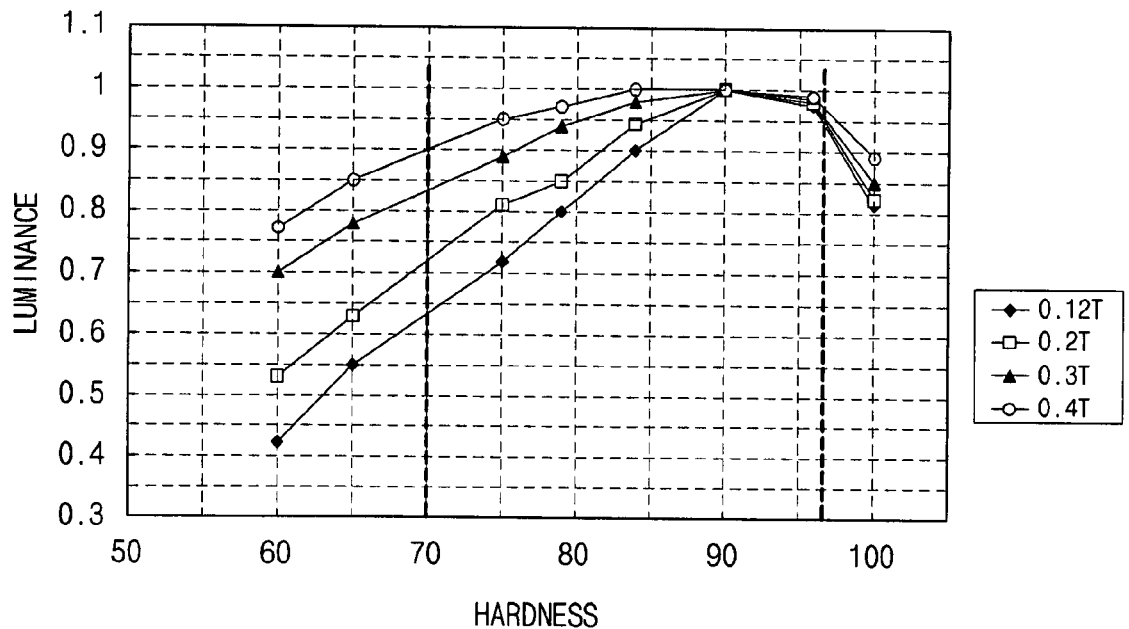
FIG. 6 is a graph of luminance versus hardness upon key enabling in a light guide plate according to the present invention.

FIG. 6 illustrates a variation of an average luminance for all keys excepting a pressed key on the assumption that a maximum luminance value is equal to 1, in state where any one key is pressed on the keypad 30. Unlike FIG. 3, it can be appreciated that the luminance reduces as, the hardness increases starting from 90 or more, and the luminance gets smaller as the hardness is greater than 96. It could be also observed that luminance abruptly varied at several key portions of the keypad 30 as any one key was repeatedly pressed and unpressed. In case where the hardness is almost equal to 100, there is a possibility that a user feels as if pressing not one key but the entire keypad 30, thereby causing key malfunction, when pressing the key.

Figure 7:
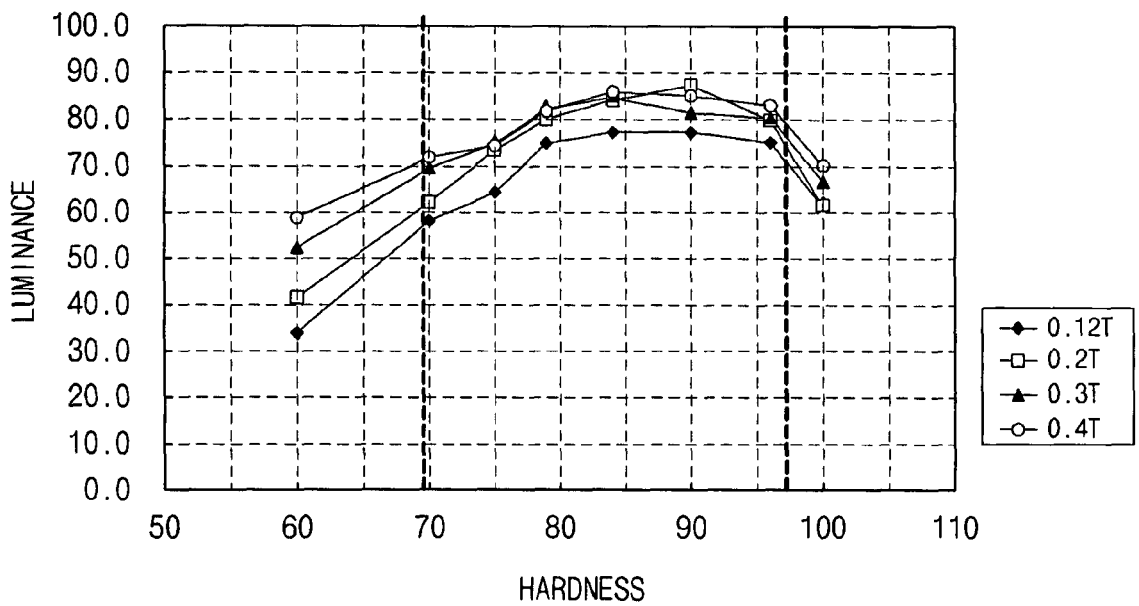
FIG. 7 is a graph of luminance uniformity versus hardness upon key enabling in a light guide plate according to the present invention.

FIG. 7 illustrates a variation of luminance uniformity for all keys excepting a pressed key when any one key is pressed on the keypad 30. FIG. 7 is shown alike to FIG. 6. FIG. 7 shows that the luminance uniformity reduces as the hardness gets smaller starting from 70, and the luminance uniformity is kept when hardness ranges from 70 to 96 and again reduces when the hardness is more than 96.

The reason can be presumed that when the hardness is less than a predetermined level, the bending occurs and the light guide plate is adhered and stuck to upper/lower material such as the metal dome switch, thereby causing light loss at a pressed key and a specific position and abnormally deteriorating the luminance uniformity because of a bright region and a dark region not properly receiving light. Also, the reason can be presumed that when the hardness is more than a predetermined level, there does not exist ductility seen from a rubber product and thus, upon key enabling, the entire light guide plate is drawn centering on an enabled key, thereby causing wave shaped bending throughout the entire light guide plate and suddenly getting worse light incidence and light guide efficiencies.

Figure 8:
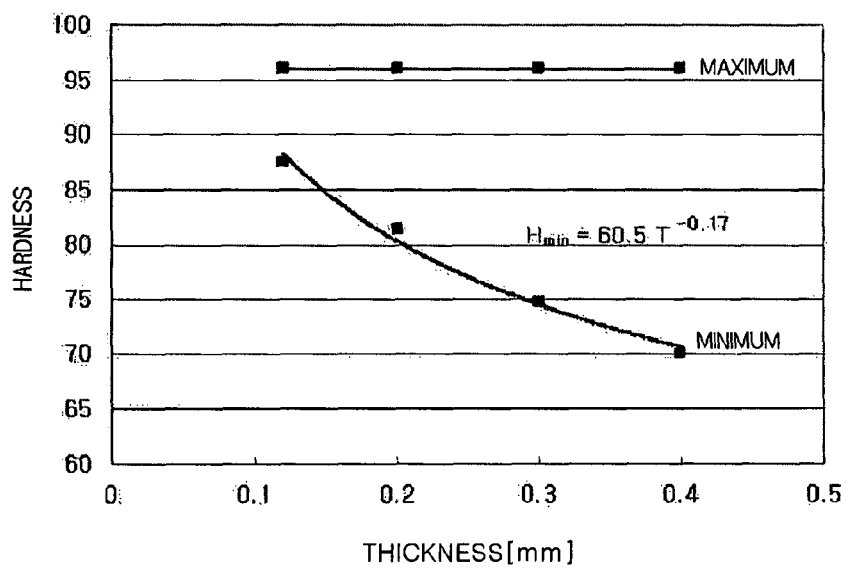
FIG. 8 is a graph of optimal hardness versus thickness in a light guide plate according to the present invention.

FIG. 8, a summarized conclusion, is a graph of minimum hardness and maximum hardness versus thickness, satisfying a condition that the luminance is more than 90% of the maximum luminance and the luminance uniformity is more than 70%, before and during key enabling. A region between up and down lines represents an optimal range of hardness. It can be appreciated that an available minimum hardness as the light guide plate gets thinner is expressed as in Equation 1 below:

$$H_{min} \to 60.5 T^{-0.18} \quad \text{[Equation 1]}$$

where, $H_{min}$: required minimum hardness, and

T: thickness of light guide plate (mm).

It can be appreciated that a maximum hardness is equal to 96 in the Equation 1.

According to the experimental result, when the light guide plate has a thickness of 0.4 mm, it is proper that the required hardness is within a range of 70 to 96 on the basis of a range satisfying a level of 90% of the maximum luminance.

Light guide plate material should satisfy the required hardness property despite having sufficient transmittance and ductility, and should have almost no adhesion because of a greater interfacial energy than that of silicon, and should be applicable even at a small thickness, thereby making a slim design possible. It is desirable that the material satisfying the required hardness property uses the polyurethane-based high transparent resin material.

The above description of the keypad 30 and the back light unit, that is, the light guide plate 10 each installed separately is made.

Figure 9:
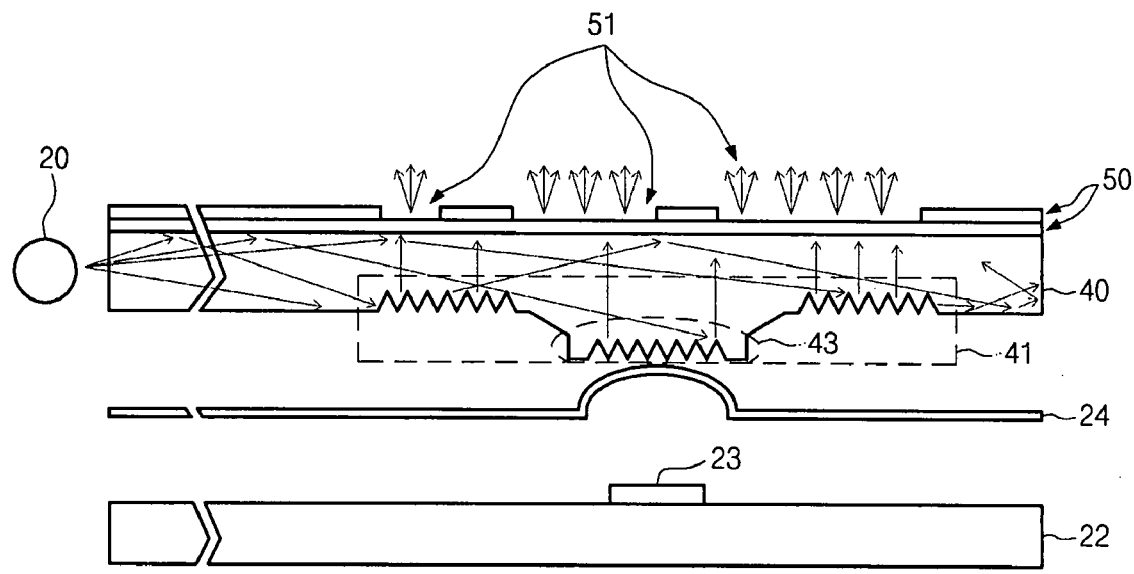
FIG. 9 is a schematic diagram illustrating a keypad apparatus integral with a light guide plate according to the present invention.

FIG. 9 is a schematic diagram illustrating a keypad combination back light unit according to the present invention. Construction and operation of the back light unit whose keypad and light guide plate are integrally formed will be described with reference to FIG. 9 below. The keypad refers to a character layer 50.

The keypad combination back light unit according to the present invention includes the character layer 50, the light guide plate 40 having the light guide pattern part 41, a metal dome switch 24, a switch contact part 23, and a printed circuit board 22.

According to the present invention, in particular, the character layer 50 is provided on an upper surface of the light guide plate 40, and integrated with the light guide plate 40.

The character layer 50 refers to the keypad including a plurality of character, numeric, and symbol keys. It is desirable that a character, a numeral, and a symbol required for the keypad are printed using a printing method. They are installed such that backlight does not leak from a background surface excepting the required character, numeral, and symbol, that is, a character opening part 51. It is also possible to coat and install a separate transparent protective layer for the purpose of improving durability of the printed character layer. Light loss occurs because the character layer 50 is installed on a surface of the light guide plate 40 and thus has an influence on a light guide property of the light guide plate 40. However, a keypad and light guide plate integral type product having a character layer 50 on its surface has a design margin making it possible to get the light guide plate 40 thicker because it can achieve a relatively thin structure compared with a total thickness of a conventional keypad and light guide plate separated type product. In case where the light guide plate 40 is thick, the light guide efficiency increases on the whole and thus, light loss caused by the character layer 50 can be compensated to some degree.

The light guide pattern part 41 is formed on a lower surface of the light guide plate 40. The light guide pattern part 41 includes a plurality of protrusion parts 43 each corresponding to the required characters, numerals, and symbols printed on the character layer 50.

The plurality of protrusion parts 43 are to press and connect the underlying metal dome switch 24 to the switch contact part 23, when a corresponding key is pressed. The protrusion parts 43 can be formed by forming a separate material on the lower surface of the light guide plate 40 using a printing or adhering method. Alternately, the protrusion parts 43 can be integrally manufactured by shaping light guide plate material itself.

A plurality of metal domes are installed at the protrusion parts 43 only when the back light unit uses the metal dome switch 24. The metal dome can be installed integrally with the keypad, using an adhesive, such that its center is matched with the center of each protrusion part 43 to facilitate a subsequent assembly of the metal dome switch 24 and the PCB 22.

Hardness and thickness of resin material of the light guide plate 40 integral with the keypad have the same condition and property as those of FIGS. 1 to 8.

Accordingly, a key backlighting back light unit of an input device having the greatest light emission efficiency and making a very thin type design possible can be constructed.

In the following description, a light guide plate is of transparent resin material satisfying the condition of Equation 1. Thus, a description of the transparent resin material of the light guide plate will be omitted.

Figure 10:
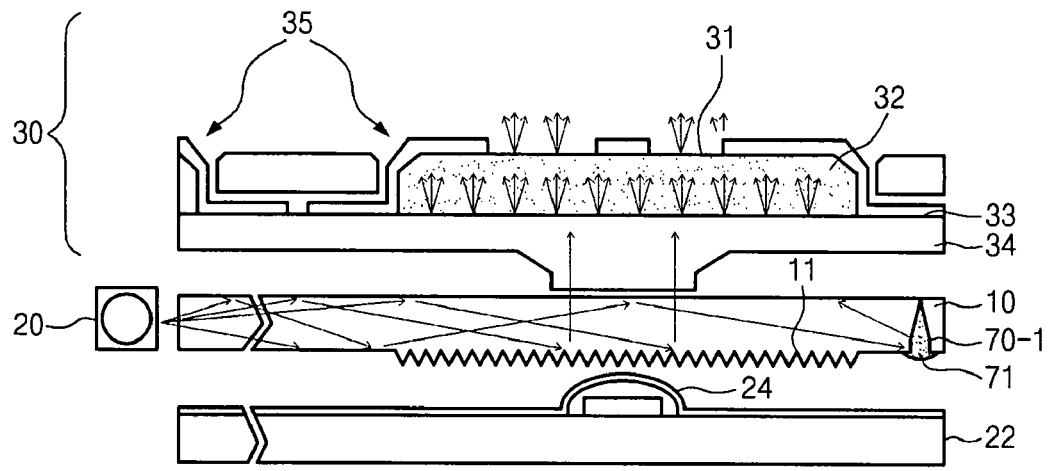
FIG. 10 illustrates a key backlighting back light unit including a light leakage prevention pattern according to the present invention.

FIG. 10 illustrates a key backlighting back light unit including a light leakage prevention pattern according to the present invention.

Referring to FIG. 10, the key backlight back light unit has the same construction as that of FIG. 1, and further includes a light leakage prevention pattern 70-1 at an opposite side edge of a light guide plate 10 having a light emitting unit 20.

The light leakage prevention pattern 70-1 reflects light not encountering a light guide pattern 11 among light irradiated from the light emitting unit 20. In other words, the light leakage prevention pattern 70-1 prevents light not encountering the light guide pattern 11 from leaking outside the light guide plate 10.

The light leakage prevention pattern 70-1 should be installed by engraving because it should prevent light from leaking outside the light guide pattern 11 at the time of light guide. A depth of the light leakage prevention pattern 70-1 should be set to 80% or more of a thickness of the light guide plate 10, and should be set to maximum 100% of the thickness of the light guide plate 10. In other words, that the light leakage prevention pattern 70-1 is set to the depth to 100% of the thickness of the light guide plate 10 means that the light leakage prevention pattern 70-1 can be provided to pass through the light guide plate 10.

In case where the depth of the light leakage prevention pattern 70-1 is set to 100%, that is, is equal to the thickness of the light guide plate 10, the light leakage prevention pattern 70-1 can be of a dashed line or can be provided in such a manner that long lines are overlapped with each other at their ends, to prevent an inner part and an edge part of the light guide plate 10 from being separated with each other.

It is desirable that the light leakage prevention pattern 70-1 is of opaque material 71 to prevent transmittance. The opaque material 71 can be black material or white material. The opaque material 71 of black material can prevent only light leakage. The opaque material 71 of white material having high reflexibility can prevent light leakage and reflect light, thereby enhancing light efficiency.

Figure 11:
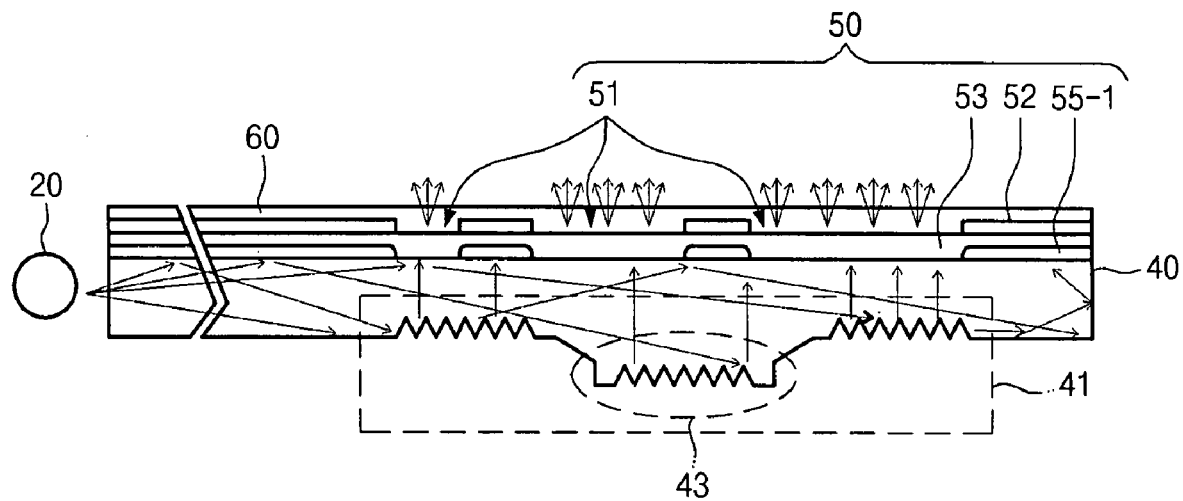
FIG. 11 illustrates a keypad combination back light unit according to the present invention.

FIG. 11 illustrates a keypad combination back light unit according to the present invention. FIG. 11 shows that a character layer 50 and a light guide plate 40 are provided under a transparent protective layer 60.

The keypad combination back light unit includes the light guide plate 40 having a light guide pattern part 41 provided on its lower surface to diffuse and scatter light at a uniform illumination in a required light emitting region; at least one light emitting unit 20 provided at a sidewall of the light guide plate 40, and irradiating light to the light guide plate 40; the character layer 50 having a character opening part 51 having a character shape, a reflection layer 55-1, a diffusion layer 53, and a display layer 52, and provided integrally with the light guide plate 40; and the transparent protective layer, 60 provided on an upper surface of the character layer 50.

The transparent protective layer 60 is used to complement a hardness of the flexible light guide plate 40 using silicon and improve an abrasion resistance of the key character layer. The transparent protective layer 60 should have a greater hardness despite having a relatively smaller thickness than the light guide plate so that it can complement the hardness of the light guide plate and achieve a slim design. Desirably, the transparent protective layer 60 has a thickness of about 0.15 mm or less. The transparent protective layer 60 has a different hardness depending on a thickness of the transparent protective layer 60. It is desirable that the transparent protective layer 60 is of plastic based transparent resin such as polycarbonate (PC), polyethylene (PE), and polyethylene terephthalate (PET) satisfying such a property. As in FIG. 9, the light guide plate 40 can include a protrusion part 43 to complement key pressing. The protrusion part 43 is manufactured to have a size and a thickness suitable to press a contact switch.

The light emitting unit 20 mainly uses a light emitting diode (LED). The light guide plate 40 is of resin material having great refractive index and transmittance to minimize a total reflection of light and an absorption loss within material, and being easily bent upon applying of an external force because of having elasticity despite having a predetermined hardness, and being easily restored to an original state from a bending state upon releasing of an external force because of having a sufficient elasticity. The resin material can use high transparent silicon, or polyurethane, polycarbonate based material.

The light guide plate 40 should have a proper thickness to obtain sufficient light guide efficiency. In a keypad and light guide plate separated type product, a light guide plate is limited in thickness to 0.4 mm or less according to a thin product design. However, a keypad and light guide plate integral type product does not include the base resin layer 34 of the keypad of FIG. 1 and thus, can greatly enlarge a thickness of a light guide plate. A design margin of the thickness of the light guide plate increases about 0.5 mm to the maximum owing to the absence of the base resin layer 34. It could be appreciated by experiment that the thickness of the light guide plate 40 should be secured minimum 0.3 mm or more, and was available up to maximum 0.6 mm.

As described above in FIG. 3, there occurs a problem that light does not smoothly encounter an end of the light guide plate 40, in case where the light guide plate 40 has a thickness of less than 0.3 mm. There occurs a problem that an amount of guided light no longer increases though the light guide plate 40 has a thickness of more than 0.6 mm, in case where a 0.4 mm light emitting diode is used as a light emitting device. In detail, the light guide plate 40 should have a thickness of at least 0.3 mm or more to obtain a light guide effect throughout an area of the light guide plate 40, and should have a thickness of 0.6 mm or less to obtain a maximum slimness effect.

Figure 12:
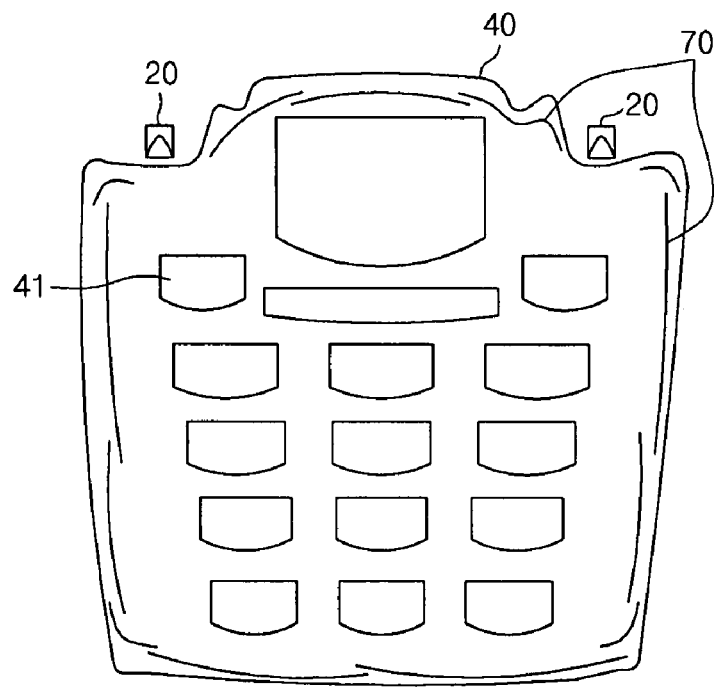
FIG. 12 is a schematic diagram illustrating a light guide plate with a light leakage prevention pattern using opaque material according to the present invention.
Figure 13:
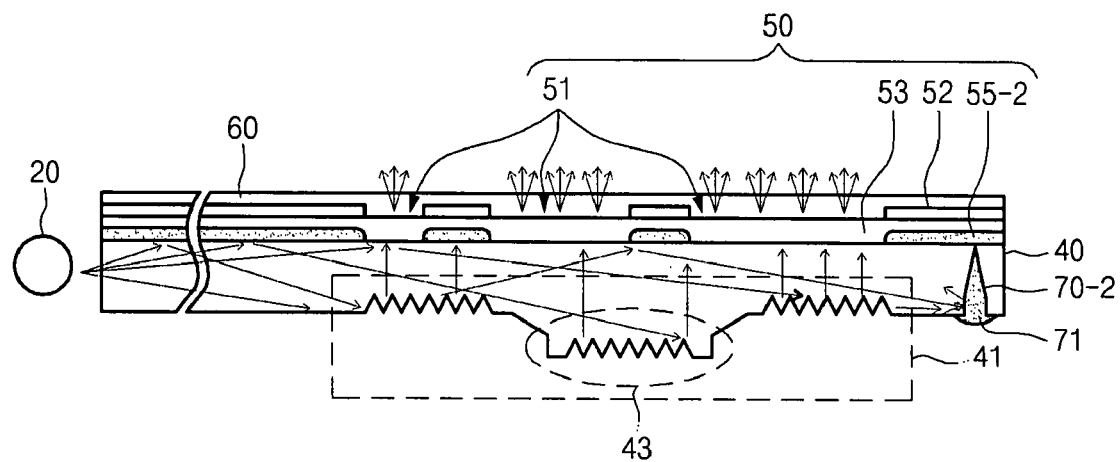
FIG. 13 illustrates a keypad apparatus having a light leakage prevention pattern using opaque material and a reflection layer according to the present invention.
Figure 14:
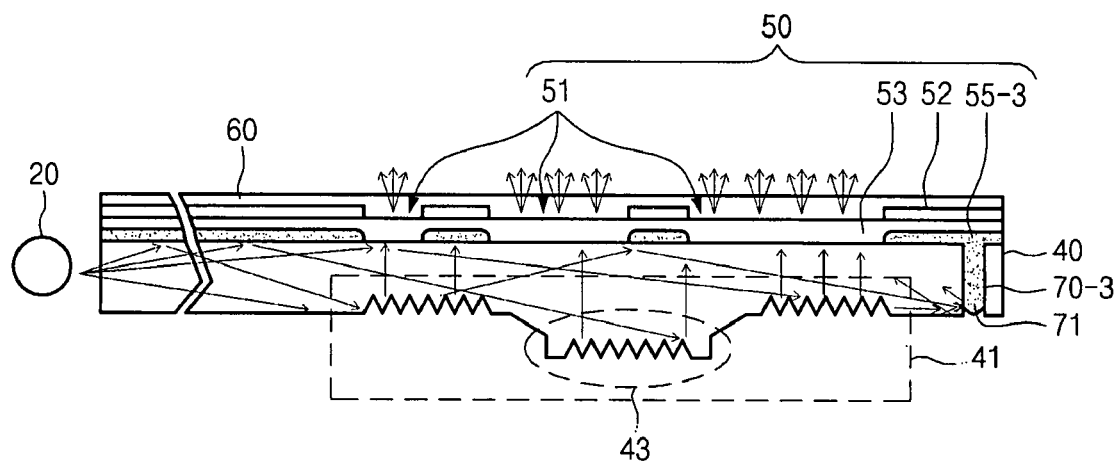
FIG. 14 illustrates a keypad apparatus in which a light leakage prevention pattern using opaque material and a reflection layer are of an integral structure according to the present invention.

FIG. 12 is a schematic diagram illustrating a light guide plate having a light leakage prevention pattern 70 using opaque material according to the present invention. FIG. 13 illustrates a keypad apparatus having a light leakage prevention pattern 70-2 using opaque material and a reflection layer 55-2 according to the present invention. FIG. 14 illustrates a keypad apparatus in which a light leakage prevention pattern 70-3 using opaque material and a reflection layer 55-3 are of an integral structure according to the present invention. FIG.

Figure 16:
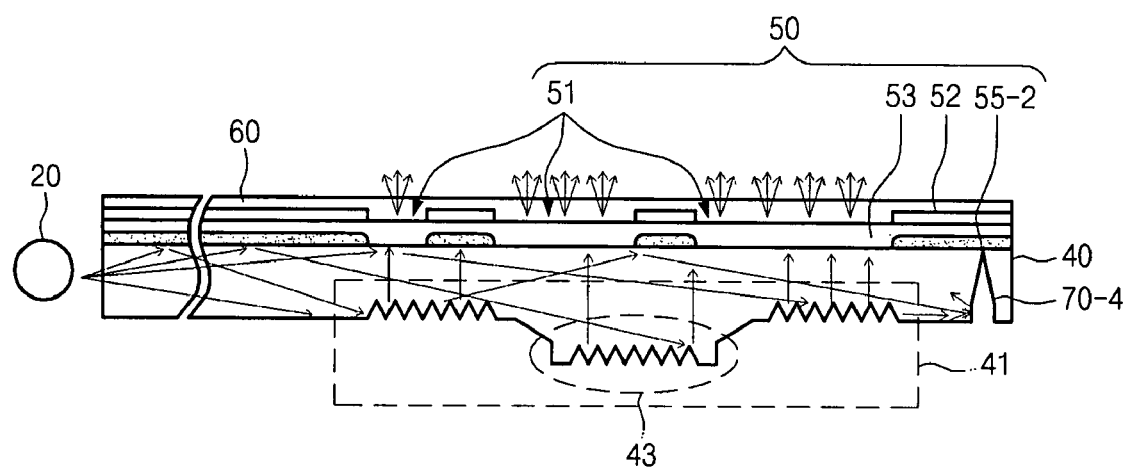
FIG. 16 illustrates a keypad apparatus having a light leakage prevention pattern not using opaque material according to the present invention.

15 is a schematic diagram illustrating a light guide plate having a light leakage prevention pattern 70 formed on a slant in a light emitting device according to the present invention. FIG. 16 illustrates a keypad apparatus having a light leakage prevention pattern 70-4 not using opaque material according to the present invention.

Referring below to FIGS. 12 to 16, a light guide plate 40 can further include a separate light leakage prevention pattern 70, 70-2, 70-3, or 70-4 greater in length than a light guide pattern. The light leakage prevention pattern 70, 70-2, 70-3, or 70-4 is provided at an edge of the light guide plate 40, and is not provided in a position where a light source is disposed.

The light leakage prevention pattern 70, 70-2, 70-3, or 70-4 should be installed by engraving because it should exclude light at the time of light guide. A depth of the light leakage prevention pattern 70, 70-2, 70-3, or 70-4 can be set to 80% to maximum 100% of a thickness of the light guide plate 40. In case where the depth of the light leakage prevention pattern 70, 70-2, 70-3, or 70-4 is set to 100% of the thickness of the light guide plate 40, the light leakage prevention pattern 70, 70-2, 70-3, or 70-4 can be of a dashed line or can be provided in such a manner that long lines are overlapped with each other at their ends, to prevent an inner part and an edge part of the light guide plate 40 from being separated with each other.

As shown in FIG. 14, the light leakage prevention pattern 70-3 can be also provided integrally with the reflection layer 55-3 because the character layer 50 is provided on an upper surface of the light guide plate 40 integrally with the light guide plate 40, in case where the depth of the light leakage prevention pattern 70-3 is set to 100% of the thickness of the light guide plate. The reflection layer is provided to have a greater thickness at the light leakage prevention pattern than at a bottom of the character layer.

Figure 15:
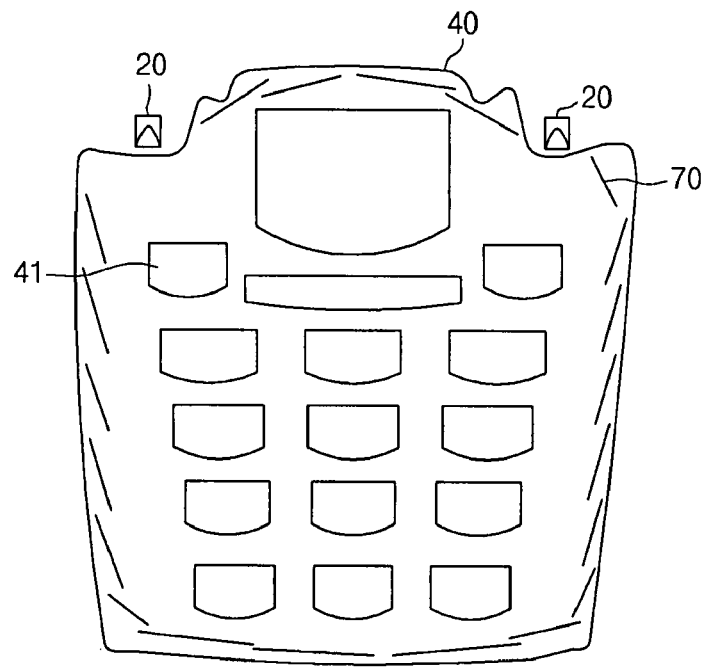
FIG. 15 is a schematic diagram illustrating a light guide plate having a light leakage prevention pattern formed on a slant in a light emitting device according to the present invention.

The light leakage prevention pattern 70-4 can be disposed in a slant direction not at right angles with a light source as shown in FIG. 15 so that light travels in other directions not toward an edge, to obtain a light leakage prevention effect without opaque material as shown in FIG. 16. The non-use of the opaque material 71 results in additional omission of a manufacture process and thus, increases productivity and reduces a manufacture cost.

Figure 17:
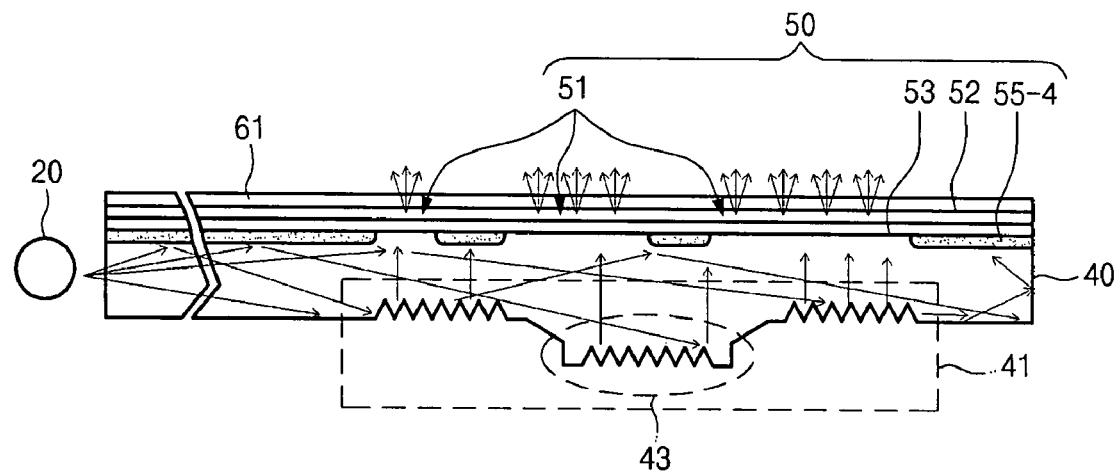
FIG. 17 illustrates a keypad apparatus having a transparent film used as a transparent protective layer, and having a character layer and a light guide plate sequentially formed on the transparent film according to the present invention.

FIG. 17 illustrates a keypad apparatus having a transparent resin film 61 used as a transparent protective layer 60, and a character layer 50 and a light guide plate 40 sequentially formed on the transparent resin film 61 according to the present invention. FIG. 17 shows that a reflection layer 55-4 of the character layer 50 is provided inside the light guide plate 40.

Figure 18:
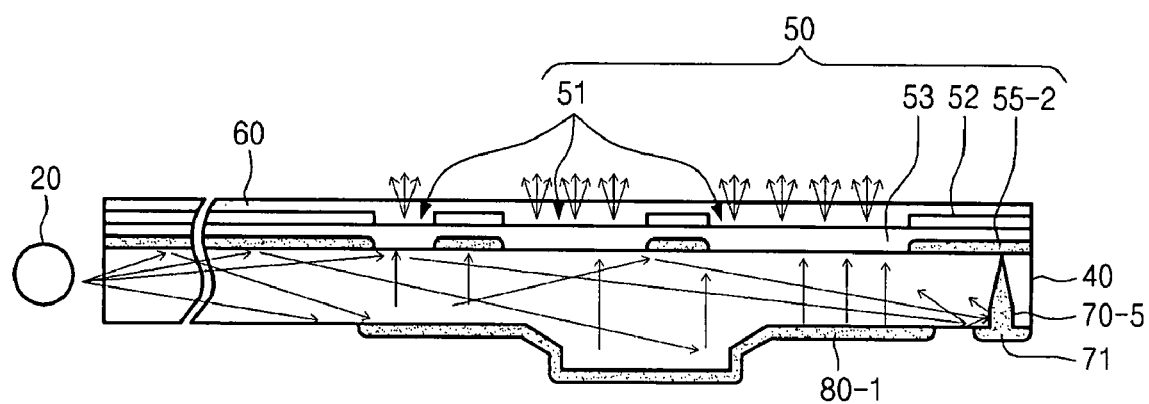
FIG. 18 illustrates a keypad apparatus having a light guide pattern part that is printed using opaque material according to the present invention.
Figure 19:
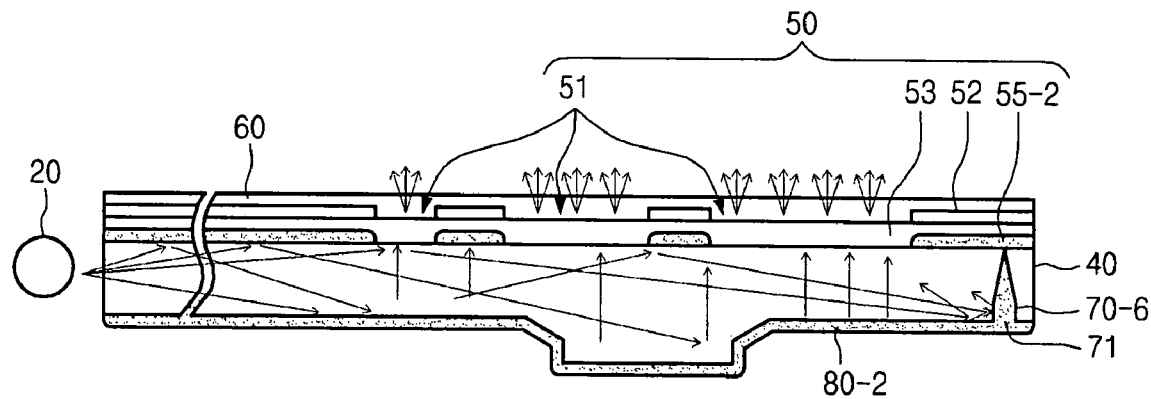
FIG. 19 illustrates a keypad apparatus having a light guide pattern part that is printed in front on an entire lower surface of a light guide plate according to the present invention.
Figure 20:
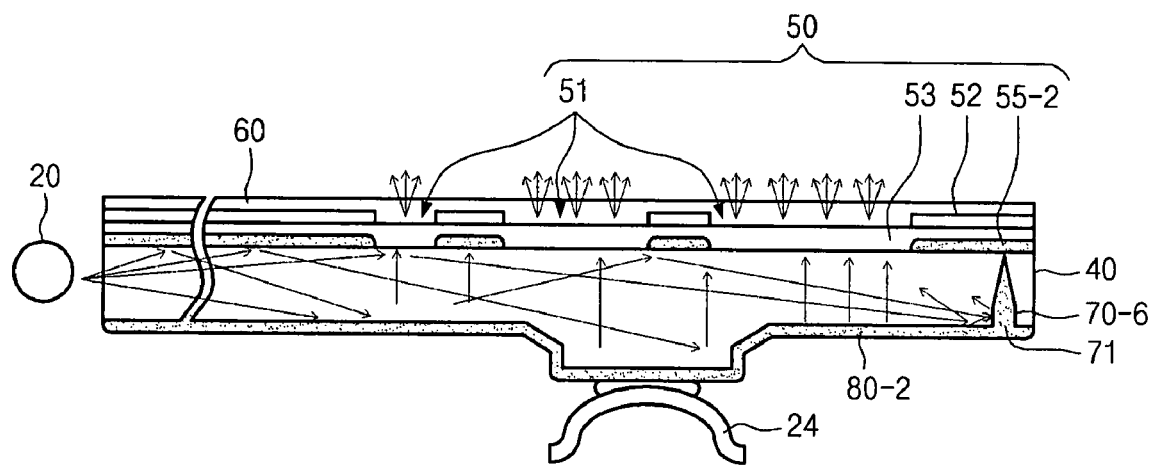
FIG. 20 illustrates a keypad apparatus having a metal dome switch provided on a lower surface of a light guide plate according to the present invention.
Figure 21:
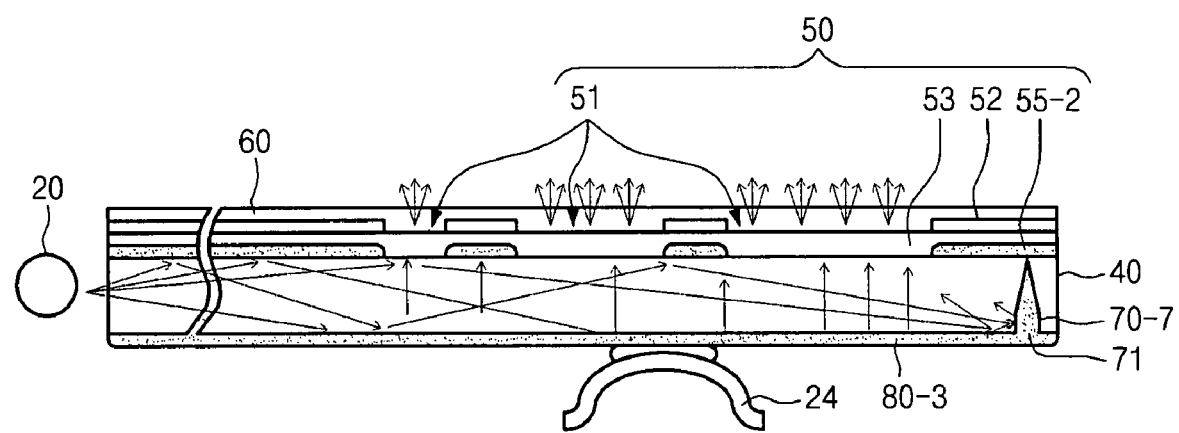
FIG. 21 illustrates a keypad apparatus having a metal dome switch provided on a lower surface of a light guide plate with no protrusion part according to the present invention.

FIGS. 18 to 21 show that a front light guide pattern part 80-1, 80-2, or 80-3 is formed on a lower surface of a light guide plate 40 by a printing method. FIG. 18 illustrates a keypad apparatus having the light guide pattern part 80-1 formed by printing using opaque material 71 according to the present invention. In FIG. 18, the front light guide pattern part 80-1 is printed at a region covering a character opening part 51. FIG. 19 illustrates a keypad apparatus having the front light guide pattern part 80-2 that is printed as a front pattern integrally with a light leakage prevention pattern 70-6 on an entire lower surface of a light guide plate 40 according to the present invention. FIG. 20 illustrates a keypad apparatus having a metal dome switch provided on a lower surface of a light guide plate 40 having a front light guide pattern part 80-2 according to the present invention. FIG. 21 illustrates a keypad apparatus having a metal dome switch provided on a lower surface of a light guide plate 40 not having a protrusion part according to the present invention.

FIGS. 18 to 21 show that the front light guide pattern part 80-1, 80-2, or 80-3 is applied to the light guide plate integral with the keypad, that is, the keypad combination back light unit. However, the front light guide pattern part 80-1, 80-2, or 80-3 is equally applicable even to a lower surface of a light guide plate of a key backlighting back light unit, which is a keypad and light guide plate separated type back light unit.

A key backlighting back light unit having a reflection layer without an air layer, and a keypad combination back light unit will be described with reference to the drawings below.

Figure 22:
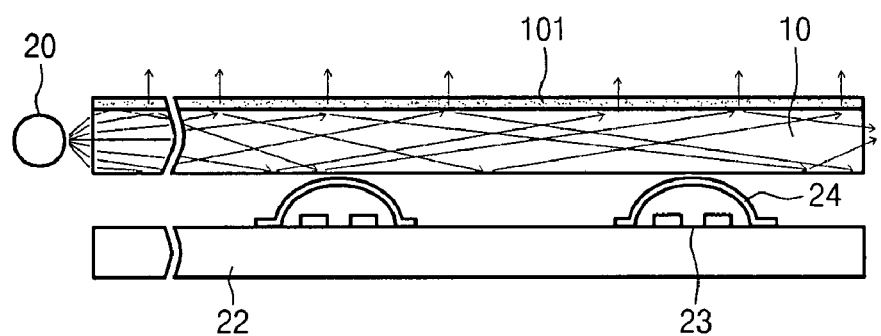
FIG. 22 illustrates a construction of a key backlighting back light unit having a reflection layer formed on an entire upper surface of a light guide plate according to the present invention.
Figure 23:
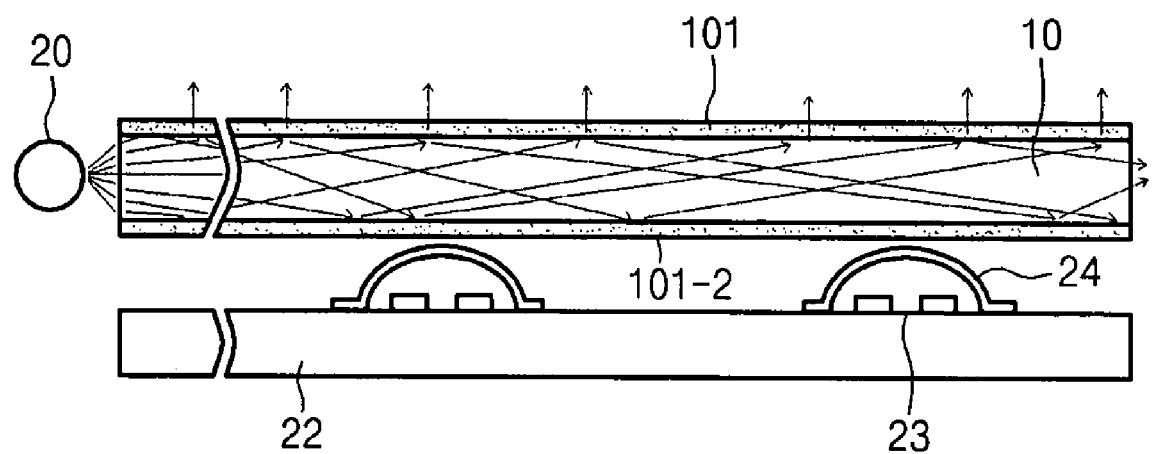
FIG. 23 illustrates a construction of a key backlighting back light unit having reflection layers formed on entire upper and lower surfaces of a light guide plate according to the present invention.

FIG. 22 illustrates a construction of a key backlighting back light unit having a reflection layer formed on an entire upper surface of a light guide plate according to the present invention. FIG. 23 illustrates a construction of a key backlighting back light unit having reflection layers formed on entire upper and lower surfaces of a light guide plate according to the present invention. Reference numeral 10 denotes a light guide plate, and reference numeral 20 denotes a light emitting unit, and reference numerals 101 and 101-2 denote the reflection layers.

In FIG. 22, the reflection layer 101 is disposed only on the entire upper surface of the light guide plate 10 without an air layer, using a printing or adhering method. In FIG. 23, the reflection layers 101 and 101-2 are disposed only on the entire upper and lower surfaces without an air layer, using the printing or adhering method.

The reflection layers 101 and 101-2 have a diffusion function to some degree and therefore, light guide can be implemented only by the reflection layers 101 and 101-2 over the entire surface without an additional light guide pattern. The reflection layers 101 and 101-2 are of material having a refractive index as small as possible. The reflection layers 101 and 101-2 are formed by printing material having great reflection efficiency. The reflection layers 101 and 101-2 can be of color material in case where it is desired to change a color of emitted light. However, it is desirable that the reflection layers 101 and 101-2 are of white material to increase light efficiency to the maximum, and it is desirable that a separate color layer is added to a character layer only at a required region. In case where the reflection layer material and the light guide plate are not well adhered to each other, it is desirable to coat a separate primer before providing the reflection layer material. In case where the reflection layer 101 or 101-2 is formed on the upper surface as shown in FIG. 22, it can be disposed, though not illustrated, to cover an entire area of a light guide plate excluding a character opening part of a keypad through light passes. Alternately, the reflection layer 101 or 101-2 can be disposed to cover all an entire area of a light guide plate including a character opening part. In case where the light guide plate includes even the character opening part, light diffused in the reflection layers 101 and 101-2 partially transmits and exits from the reflection layers 101 and 101-2 through the character opening part.

Desirably, the light emitting unit 20 mainly uses an LED. The light emitting unit 20 is formed together with the metal dome switch 24 on a printed circuit board 22.

The light guide plate 10 is required to have a property of material having great refractive index and transmittance to minimize a total reflection of light and an absorption loss within material, and being easily bent upon applying of an external force because of having elasticity despite having a predetermined hardness, and being easily restored to an original state from a bending state resulting from the keypad and user's pressing upon releasing of an external force because of having a sufficient elasticity. For example, it is desirable that a hardness of the light guide plate is decided to satisfy the Equation 1 condition. In particular, the refractive index is of much importance because a parallel component of light incident from a light emitting device to a light guide plate increases and a total reflection efficiency increases, as a value of the refractive index increases.

Figure 24A:
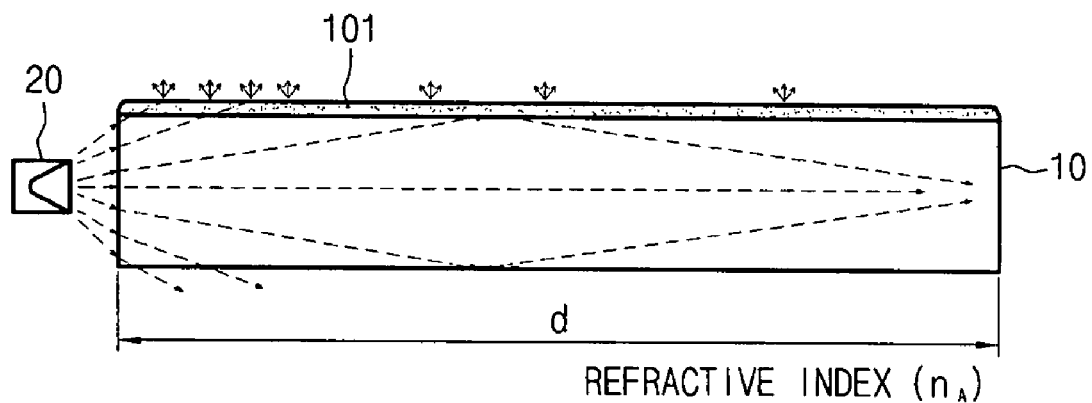
FIG. 24 illustrates a light guide plate property depending on a difference between refractive indices in a light guide plate under the same condition according to the present invention.
Figure 24B:
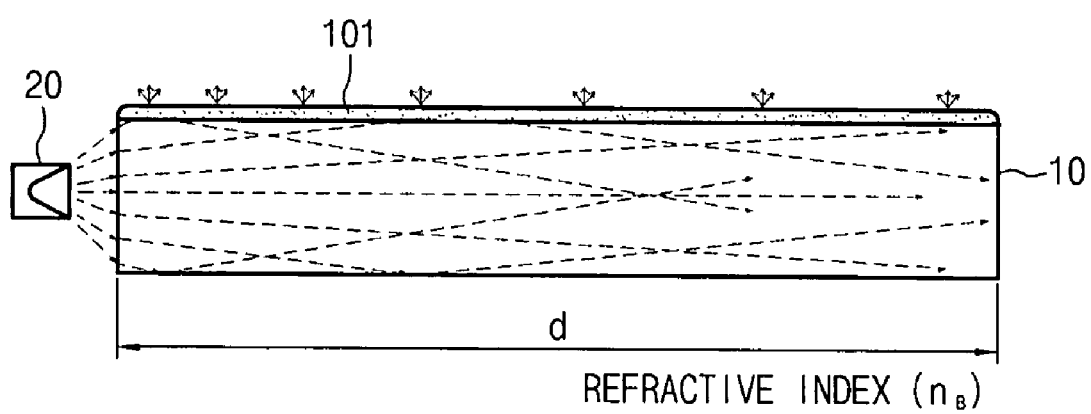
Figure 25:
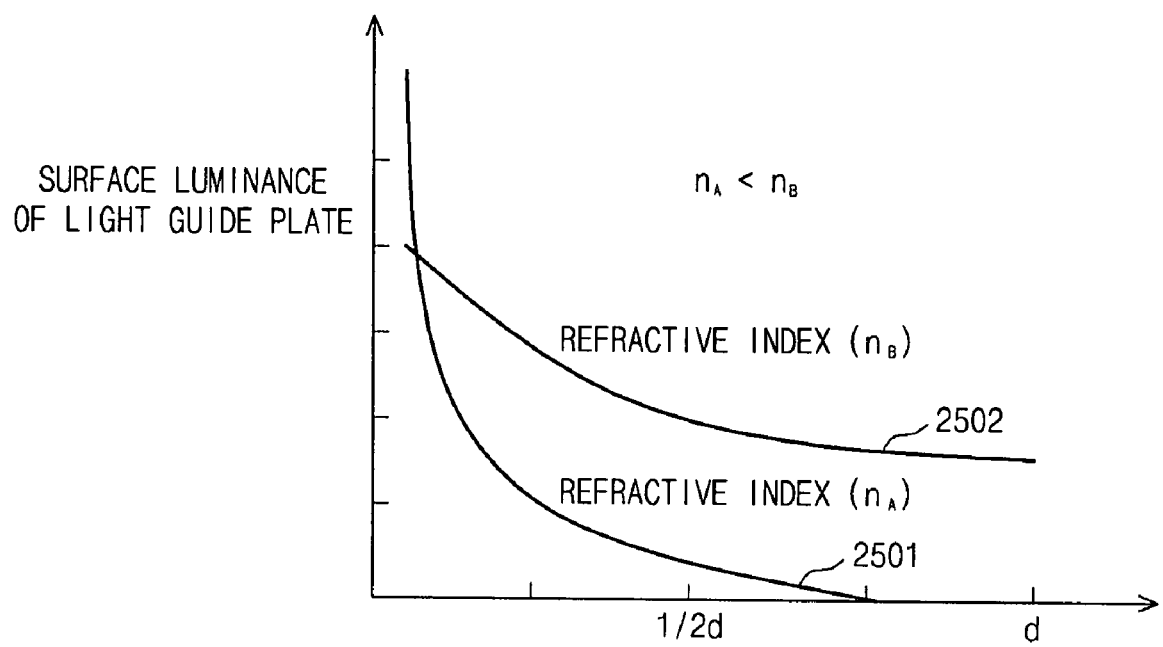
FIG. 25 is a graph of luminance at each position of light guide plate versus difference between refractive indices according to the present invention.

FIG. 24 illustrates a light guide plate property depending on a difference between refractive indices in the light guide plate under the same condition according to the present invention. FIG. 24A shows a refraction state in a light guide plate having a refractive index ($n_A$), and FIG. 24B shows a refraction state in a light guide plate having a refractive index ($n_B$). FIG. 25 is a graph of luminance at each position of light guide plate versus difference between refractive indices according to the present invention. Light refraction and light efficiency based on the refractive index will be described with reference to FIGS. 24 and 25 below. However, $n_A < n_B$.

FIG. 24 shows the light guide property depending on the difference between the refractive indices in the light guide plate 10 under the same condition. Reflection and refraction of light concurrently occur when light travels an interface between media. Light reflects at a reflection angle equaling to an incident angle to the normal of the interface, but some light transmit through the interface between the two media. The refraction occurs and changes a light traveling path because of a difference between velocities of light traveling in the two media. The refraction occurs at specific refraction angles according to inherent properties of the media. A value obtained using a ratio of an incident angle to a refraction angle is the refractive index. The refractive index plays a role of importance in a light guide plate 10 when light emitted from a light emitting unit 20 is incident on a side surface of the light guide plate 10. In case where the refractive index is low, light encounters upper and lower surfaces of the light guide plate 10 at a relatively small incident angle because a refraction angle of light emitted from the LED (that is, the light emitting unit 20) and incident on the side surface of the light guide plate 10 is small. Accordingly, much light does not totally reflect within the light guide plate 10 and escapes outside the light guide plate 10, thereby causing a great light loss at a contact portion between the light guide plate 10 and the LED (that is, the light emitting unit 20). On the contrary, in case where the refractive index is high, light incident inside the light guide plate 10 encounters at a relatively great incident angle when it again encounters the upper or lower surface of the light guide plate 10, because a great amount of light is refracted in an incidence region. In case where the incident angle is great and thus satisfies a condition of more than a critical angle as above, total reflection occurs, thereby enabling light guide over an entire area of the light guide plate without light loss outside the light guide plate.

As shown in FIGS. 24 and 25, it can be seen that light propagates to some extent from a light incidence region to an end of the light guide plate in case where the refractive index is relatively great. As seen from FIG. 24A and a curve 2501 of FIG. 5, in case where the light guide plate 10 is of material whose refractive index ($n_A$) is low, the light guide plate 10 emits much light and induces high luminance at its light incidence region, but does not almost induce luminance at its end. In other words, a brightness difference within the light guide plate is of significance. Compared to a reflection layer 101, the greater the refractive index, the greater total reflection efficiency and thus, light loss gets small. Therefore, the refractive index of the light guide plate 10 should be greater than that of the reflection layer 101. According to the experimental result, the light guide plate 10 of material whose absolute refractive index is about 1.4 has an effective refractive angle at its side surface by about 44.4 degrees that can result in more than an incident angle enabling the total reflection on the upper and lower surfaces of the light guide plate 10, that is, a critical angle for the total reflection. The light guide plate 10 of material whose absolute refractive index is about 1.6 has an effective refractive angle of about 51.3 degrees. A difference between the effective refractive angles is about 13.8 degrees. In detail, it can be seen that an increase of the refractive index results in an increase of the effective refractive angle by about 15.5%. In other words, it can be seen that an amount of light totally reflecting gets larger as the effective refractive angle get larger, thereby improving the light efficiency.

In case where the light guide plate 10 has a separate material on its one surface to form an integral type keypad as shown in FIG. 4, a refractive angle varies. In detail, the refractive angle varies because media are different from each other. The medium has a great refractive index of more than 1 when it is not air. In this case, a total reflection critical angle gets larger when a secondary medium is air. In other words, the effective refractive angle also reduces. Light is emitted by partial transmission even when white reflection material is used to minimize the light loss. The refractive index plays a role of much importance when light is emitted. The light guide plate 10 loses much light at its side surface and thus, wholly reduces a uniformity of luminance, when it is of material whose refractive index is small. The experimental result was that an efficiency of light guide through the entire light guide plate 10 is improved when the refractive index is 1.5 or more. Resin satisfying such a property is polyurethane based material. It is desirable to use, in particular, thermoplastic polyurethane resin to acquire a greater refractive index.

Figure 26:
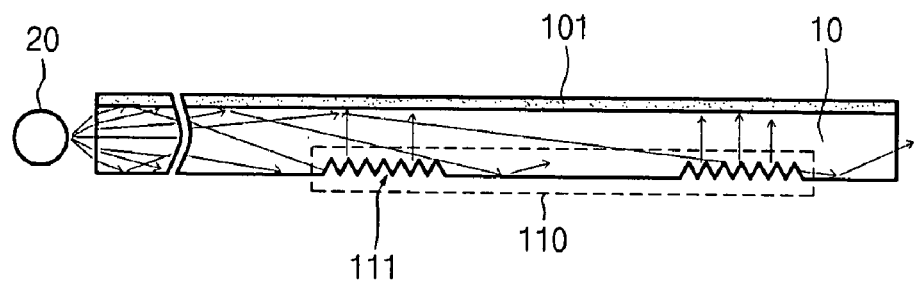
FIG. 26 illustrates a light guide plate having a reflection layer formed on its upper surface and having a light guide pattern formed on its lower surface according to the present invention.

FIG. 26 illustrates a light guide plate having a reflection layer formed on its upper surface and having a light guide pattern formed on its lower surface according to the present invention.

A light guide pattern part 110 additionally having a light guide pattern 111 as shown in FIG. 26 can be provided on the lower surface of the light guide plate 10. A product requiring a great appearance needs an additional countermeasure because there occurs a luminance difference caused by a refractive index to some degree within the light guide plate 10 as shown in FIG. 25, in case where the light guide pattern part 110 is not provided. After that, a work for separately controlling a transmittance can be also performed at a keypad to make a luminance uniform. However, this method achieves adjustment by reducing an entire luminance. A method of forming the light guide pattern part 110 on the lower surface of the light guide plate 10 with the reflection layer 101 as shown in FIG. 26 is desirable for an advanced product because it can be more accurate and can more minimize light loss than a method of forming only the light guide pattern part 110 as shown in FIG. 25.

The light guide pattern part 110 is formed on the lower surface of the light guide plate 10 to have an island shaped group with a predetermined regularity. The light guide pattern part 110 is formed to have engraving or embossing with predetermined shapes, e.g. dot, circle, straight line, dashed line, mesh patterned, and non-patterned shapes or a combination thereof. The island-like light guide pattern part 110 having a plurality of engraving or embossing is of a type of several required characters or keys. The light guide pattern part 110 is formed using printing, injection molding, extrusion, stamping, imprinting, ultrasonic processing, and laser processing methods.

In detail, the light guide pattern part 110 can be formed using various methods: the printing method using a mask having a light guide pattern formed by a separate ink, the injection molding method using a patterned metal mold, the stamping method using a heated stamp metal mold having a light guide pattern, the laser processing method where the light guide plate 10 is marked using a laser beam oscillated from a laser device, and the ultrasonic processing method using ultrasonic waves.

Figure 27:
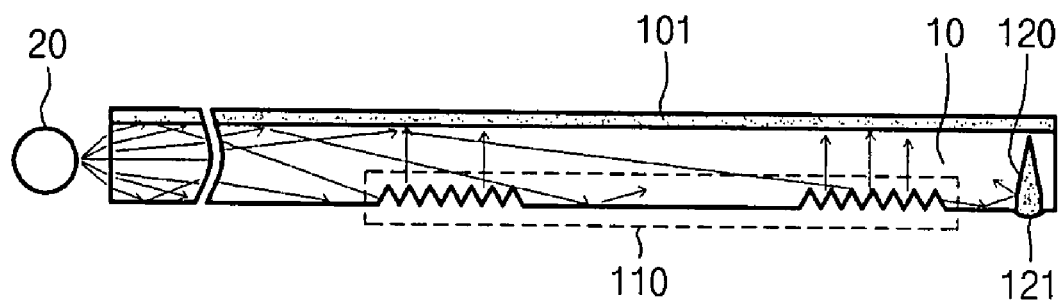
FIG. 27 illustrates a light guide plate having a light guide pattern, having a reflection layer formed on its upper surface, and having a light leakage prevention pattern formed at its edge according to the present invention.

FIG. 27 illustrates a light guide plate having a light guide pattern part, having a reflection layer 101 formed on its upper surface, and a light leakage prevention pattern 120 formed at its edge according to the present invention.

The light guide plates 10 of FIGS. 22 to 26 have a drawback of light leakage that light guided from the light emitting unit 20 leaks outside their edges. The light leakage may deteriorate a product quality and cause a shortage of light within the light guide plate 10 because light unnecessarily leaks out from a non-light-emitting region after completion of product assembly.

In order to prevent this, the present invention additionally provides an engraved light leakage prevention pattern 120 at the edge of the light guide plate 10 as shown in FIGS. 12 and 27. An engraved groove of the light leakage prevention pattern 120 is additionally filled with opaque material 121, thereby preventing the light leakage.

The opaque material 121 filled in the engraved groove of the light leakage prevention pattern 120 uses black material when aiming at only perfect light leakage prevention. The opaque material 121 uses white material when aiming at all a light reflection effect and a light leakage prevention function.

Figure 28:
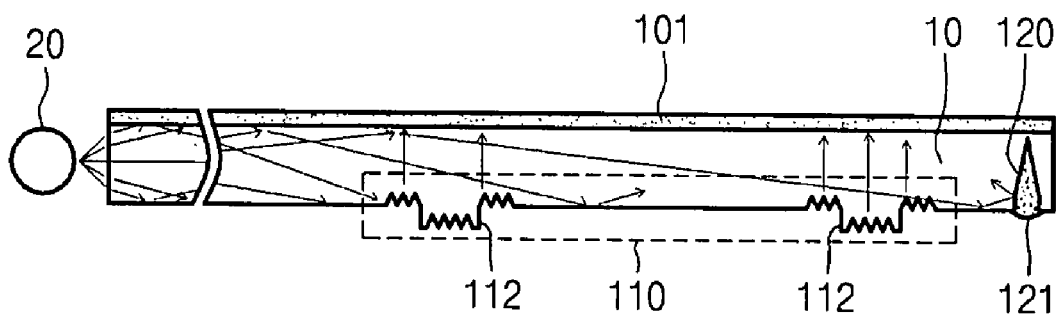
FIG. 28 illustrates a light guide plate having a reflection layer formed on its upper surface and having a protrusion part formed on its lower surface according to the present invention.
Figure 29:
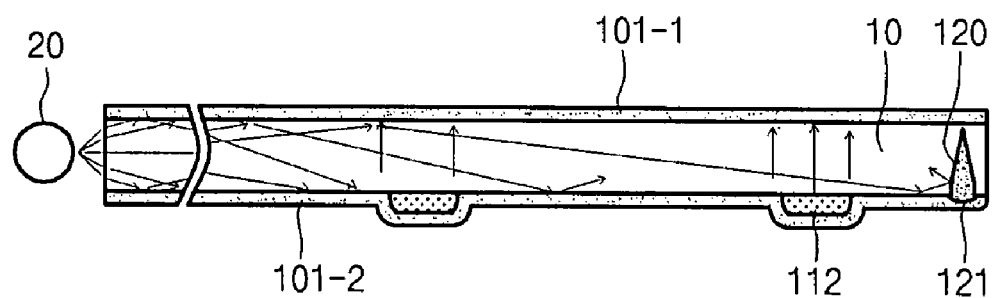
FIG. 29 illustrates a light guide plate having a reflection layer formed on its upper surface, having a protrusion part formed on its lower surface, and having a reflection layer formed on its entire lower surface according to the present invention.

FIG. 28 illustrates a light guide plate having a reflection layer formed on its upper surface and having a protrusion part formed on its lower surface according to the present invention. FIG. 29 illustrates a light guide plate having a reflection layer formed on its upper surface, having a protrusion part formed on its lower surface, and having a reflection layer formed on its entire lower surface according to the present invention.

The protrusion part 112 can be additionally provided on the lower surface of the light guide plate 10 as shown in FIGS. 28 and 29. The protrusion 112 enables the user to more accurately press a metal dome switch subsequently provided on the lower surface of the light guide plate 10. The protrusion part 112 can be formed to have a diameter of about 1 to 3 mm, and can be formed by adhering or printing a separate material thick.

It is possible to form the protrusion part 112 integrally with the light guide plate 10 at an initial time of forming the light guide plate 10 as shown in FIG. 29.

The key backlighting back light unit having the reflection layer without the air layer is described above with reference to FIGS. 22 to 29. A keypad combination back light unit having a reflection layer without an air layer will be described with reference to the drawings below.

Figure 30:
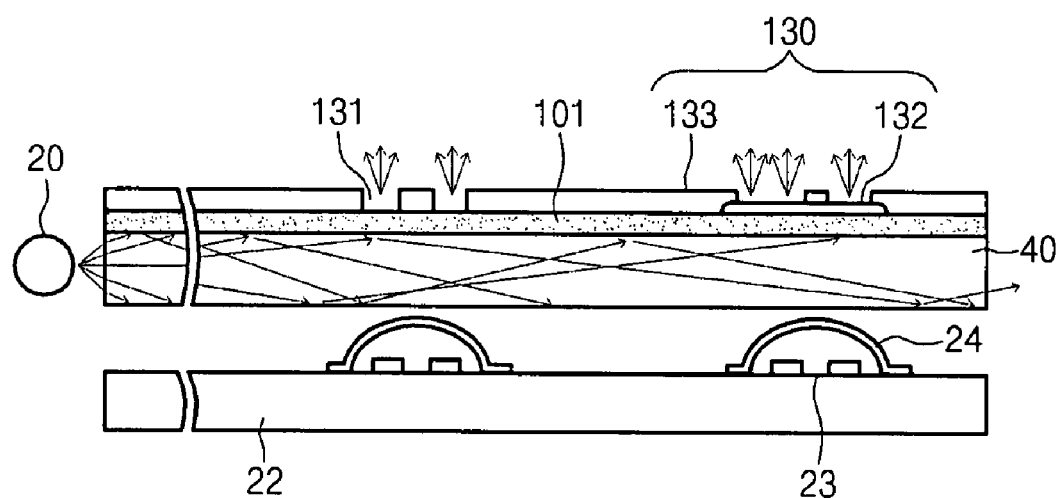
FIG. 30 illustrates a construction of a keypad combination back light unit having a reflection layer on its upper surface and having a character layer integrally formed on its upper surface according to the present invention.
Figure 31:
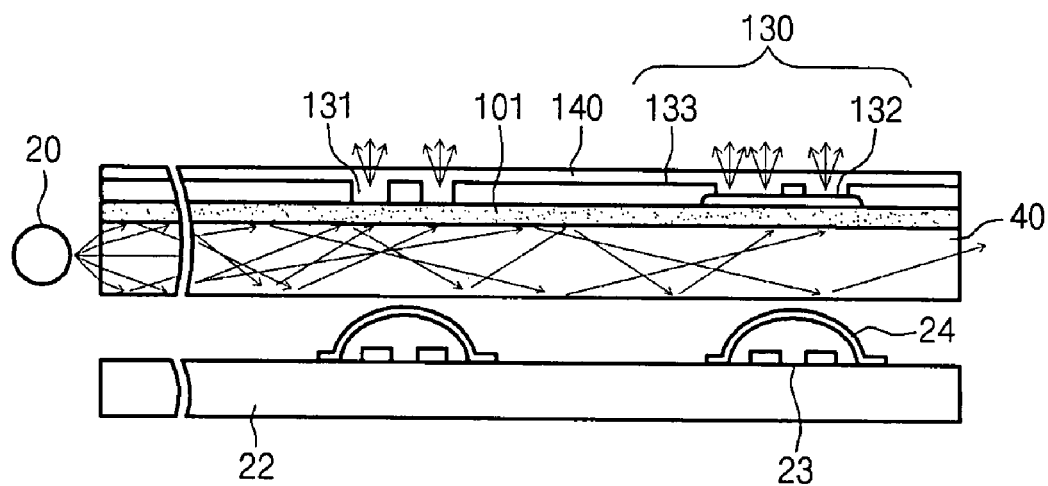
FIG. 31 illustrates a construction of a keypad combination back light unit having a transparent protective layer coated on an upper surface of the character layer of FIG. 30.
Figure 32:
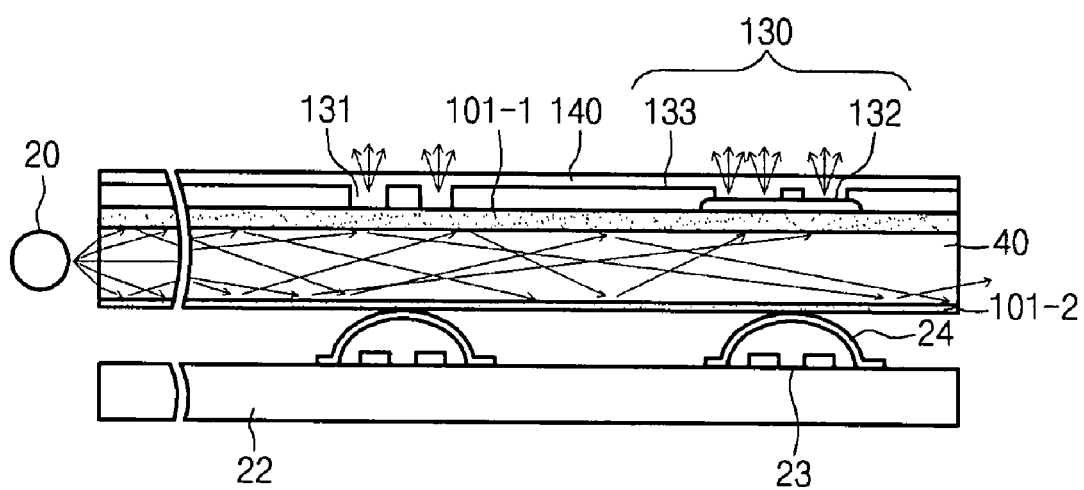
FIG. 32 illustrates a construction of a keypad combination back light unit having a reflection layer formed on a lower surface of the light guide plate of FIG. 31.
Figure 33:
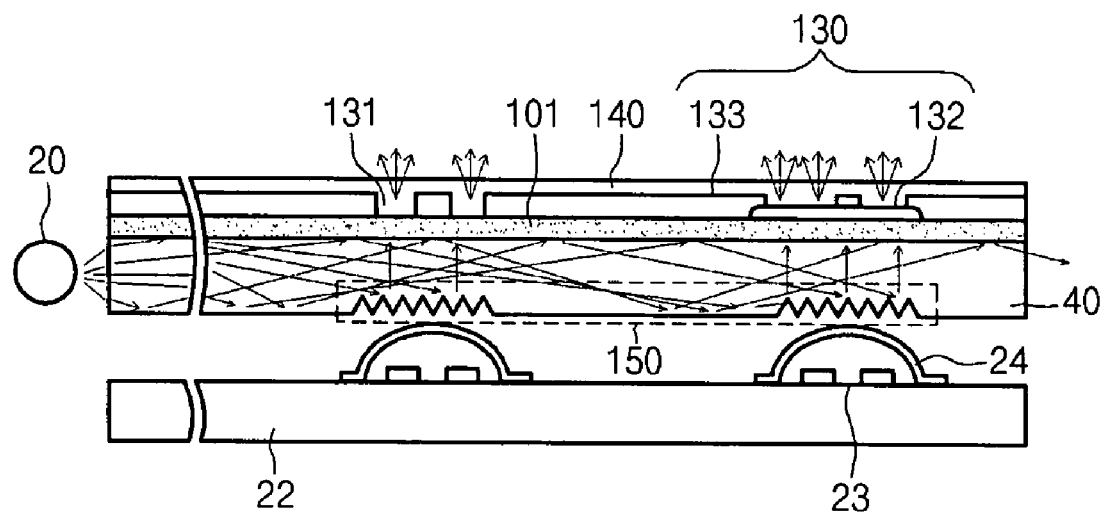
FIG. 33 illustrates a construction of a keypad combination back light unit having a light guide pattern formed on a lower surface of the light guide plate of FIG. 31.
Figure 34:
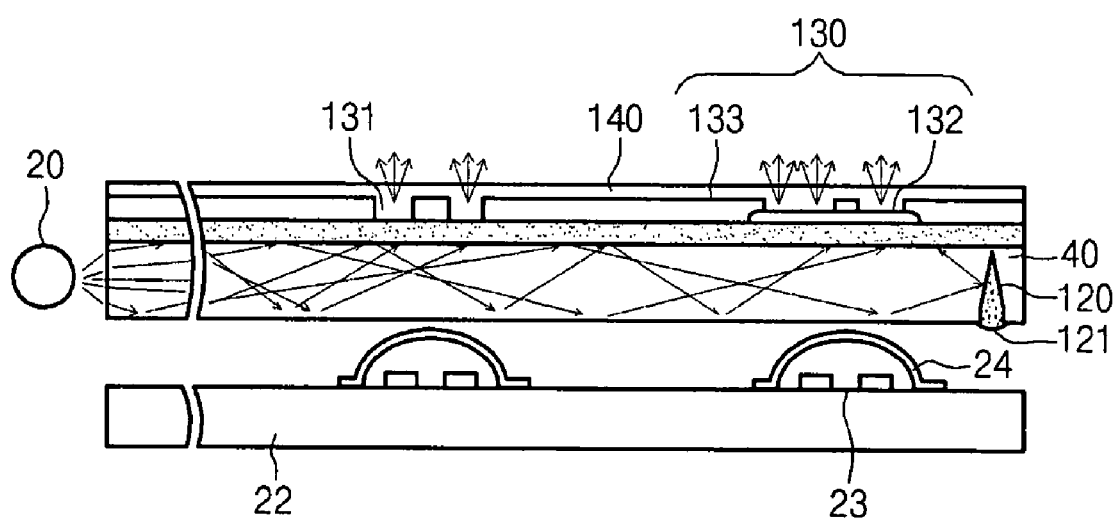
FIG. 34 illustrates a construction of a keypad combination back light unit in which a light leakage prevention pattern filled with opaque material is formed at an edge inside the light guide plate of FIG. 31.
Figure 35:
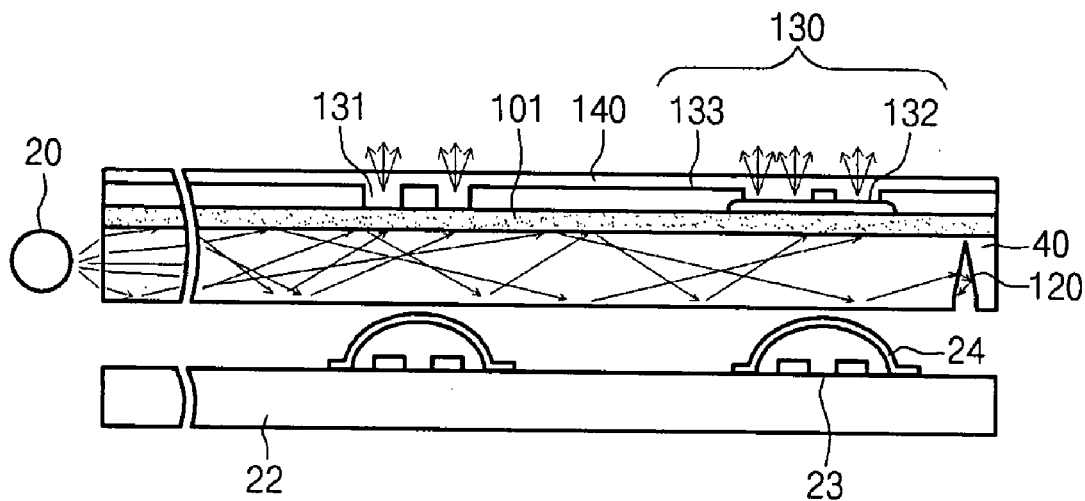
FIG. 35 illustrates a construction of a keypad combination back light unit having the light leakage prevention pattern of FIG. 34 not filled with opaque material.
Figure 36:
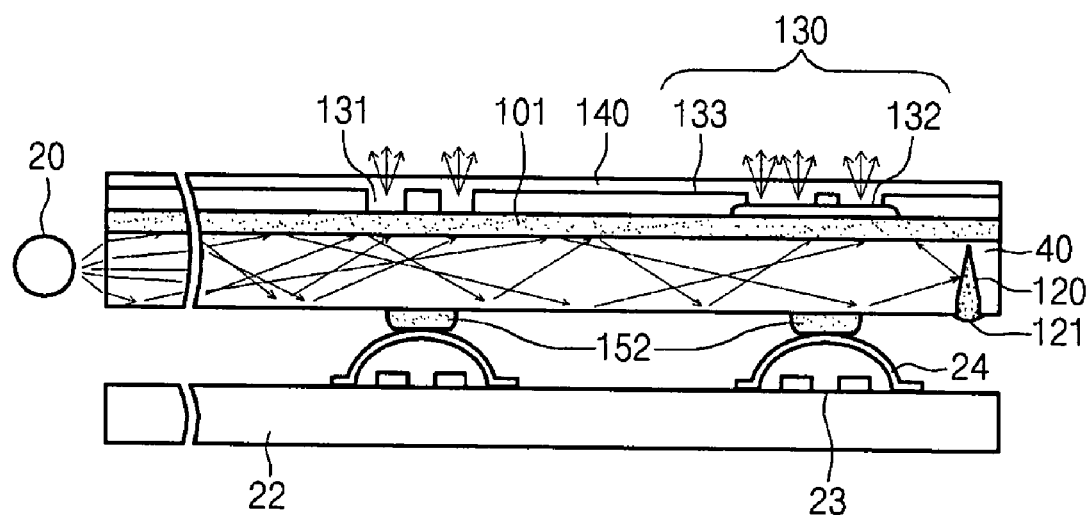
FIG. 36 illustrates a construction of a keypad combination back light unit having a protrusion part on a lower surface of the light guide pattern part of FIG. 34.
Figure 37:
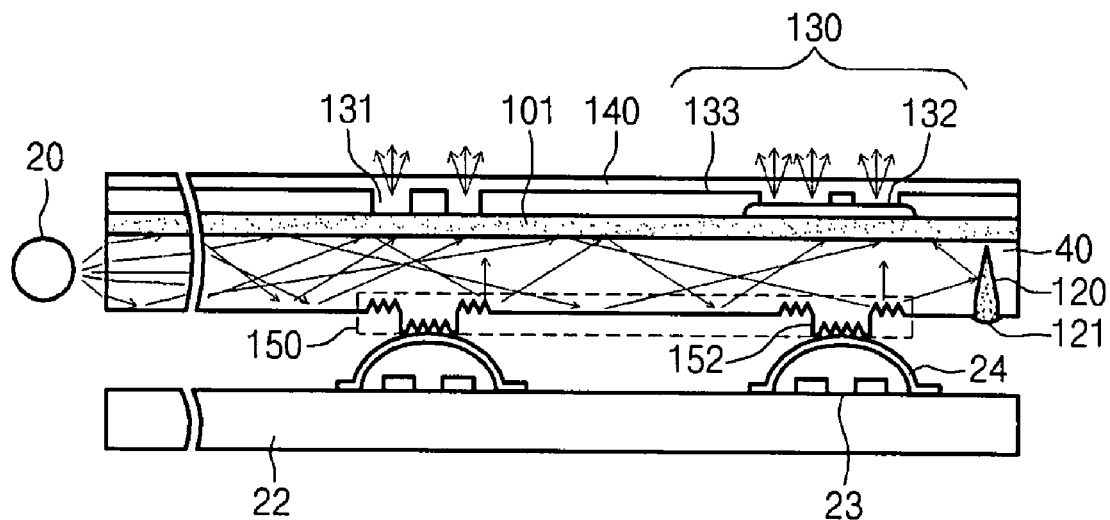
FIG. 37 illustrates a construction of a keypad combination back light unit having a light guide pattern on the lower surface of FIG. 36.
Figure 38:
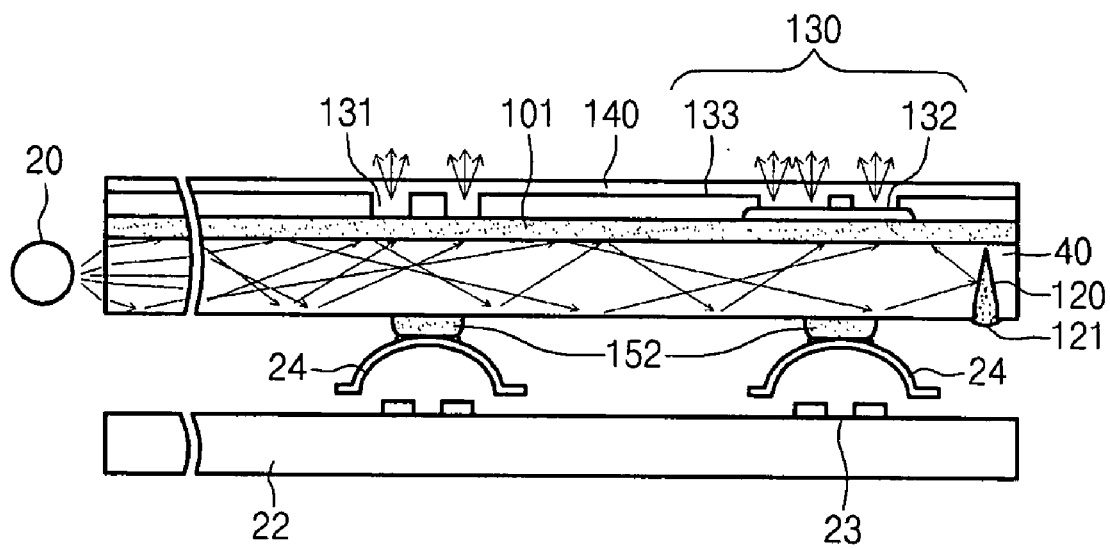
FIG. 38 illustrates a construction of a keypad combination back light unit having a metal dome provided integrally with a protrusion part on a lower surface of a light guide plate in FIG. 36.
Figure 39:
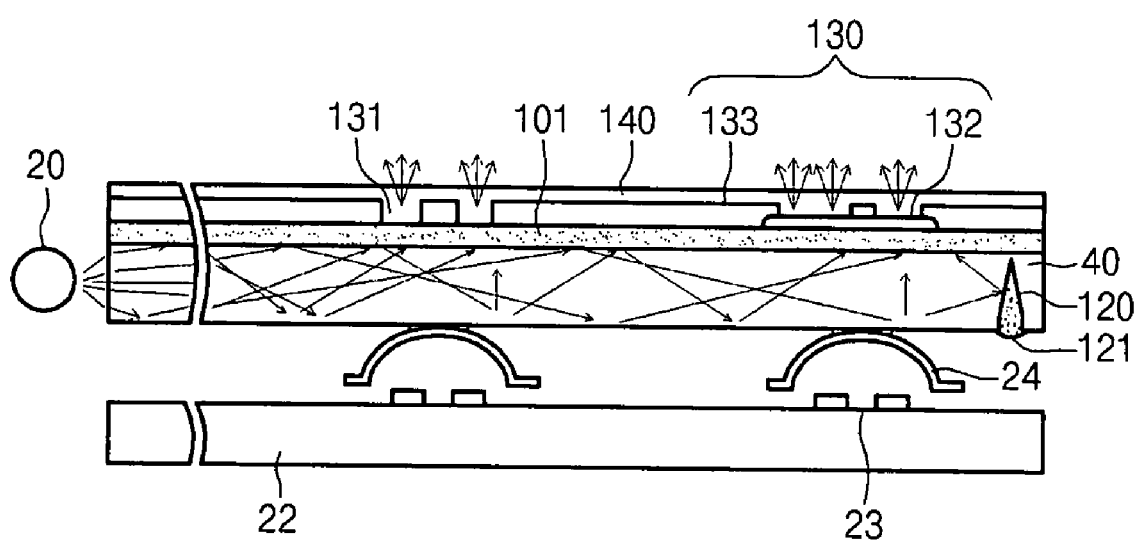
FIG. 39 illustrates a construction of a keypad combination back light unit having a metal dome provided integrally with a lower surface of a light guide plate in FIG. 35.

FIG. 30 illustrates a construction of a keypad combination back light unit having a reflection layer on its entire upper surface and having a character layer integrally formed on its upper surface according to the present invention. FIG. 31 illustrates a construction of a keypad combination back light unit having a transparent protective layer coated on an upper surface of the character layer of FIG. 30. FIG. 32 illustrates a construction of a keypad combination back light unit having a reflection layer formed on a lower surface of the light guide plate of FIG. 31. FIG. 33 illustrates a construction of a keypad combination back light unit having a light guide pattern formed on a lower surface of the light guide plate of FIG. 31. FIG. 34 illustrates a construction of a keypad combination back light unit in which a light leakage prevention pattern filled with opaque material is formed at an edge inside the light guide plate of FIG. 31. FIG. 35 illustrates a construction of a keypad combination back light unit having the light leakage prevention pattern of FIG. 34 not filled with opaque material. FIG. 36 illustrates a construction of a keypad combination back light unit having a protrusion part on a lower surface of the light guide pattern part of FIG. 34. FIG. 37 illustrates a construction of a keypad combination back light unit having a light guide pattern on the lower surface of FIG. 36. FIG. 38 illustrates a construction of a keypad combination back light unit having a metal dome integrated with a protrusion part on a lower surface of a light guide plate in FIG. 36. FIG. 39 illustrates a construction of a keypad combination back light unit having a metal dome integrated with a lower surface of a light guide plate in FIG. 35.

Construction and operation of the back light unit whose keypad and light guide plate 10 are integrally formed will be described with reference to FIG. 10 below. The keypad refers to a character layer 130 including a plurality of layers such as a display layer 133 and a color layer 132 for providing a key shape. As shown in FIG. 1, in the keypad of the key backlighting back light unit, the resin layer 32 is separately provided on its bottom, and a plurality of layers for providing a key shape are provided on the resin layer 32. However, the keypad of the keypad combination back light unit serves the function by the light guide plate 10.

The keypad combination back light unit having flexibility according to the present invention a light guide plate 40; a character layer 130 for providing a plurality of keys; a reflection layer 101 provided between an upper surface of the light guide plate 40 and a lower surface of the character layer 130 and provided at one side of a lower surface of the light guide plate 40; a light emitting unit 20 provided at a sidewall of the light guide plate and irradiating light into the light guide plate 40; and a metal dome switch 24, a switch contact part 23, and a printed circuit board 22 located under the light guide plate 40.

In particular, the reflection layer 101 provided on the upper surface of the light guide plate 40 and the character layer 130 provided on the upper surface of the reflection layer 101 are formed integrally without an air layer between the respective layers.

In other words, the reflection layer 101 is formed integrally without the air layer between the light guide plate 40 and the character layer 130, and constitute the integral type keypad using direct printing, direct shaping, or an adhesive.

The character layer 130 is the keypad for providing a plurality of character keys, numeral keys, and symbol keys. The character layer 130 is comprised of a plurality of layers such as display layers 133, color layers 132, and diffusion layers (not shown).

The display layer 133 is a layer providing a required character, numeral, and symbol by printing. The display layer 133 is provided to prevent rear light from leaking from a background surface excepting a character opening part 131. It is possible to provide the display layer 133 by directly adhering other metals or plastic materials, not printing, for more advanced display.

The color layer 132 is provided to colorfully express a color of key light emission.

The diffusion layer is, though not shown, positioned between the display layer and the reflection layer. The diffusion layer serves to make light, which emits from the light guide plate 40 through the character opening part 131, seen smooth. The diffusion layer can be omitted in case where the reflection layer 101 is separately provided.

The reflection layer 101 is provided to minimize light loss caused by light absorption at a location not the character opening part 131, and make light transmission smooth within the light guide plate 40, and has a function of partial transmittance.

Compared with the diffusion layer within the character layer 130, the reflection layer 101 can concurrently perform functions similar with each other. Thus, it is difficult to perfectly distinguish them. In detail, the reflection layer 101 performs not only reflection but also partial diffusion and scatter unlike a mirror having only a reflection function without a scatter or diffusion function. Also, the diffusion layer has a partial reflection function in addition to a diffusion function and thus, can use material similar with the diffusion layer. In other words, material can be combined at a suitable proportion according to a user usage, thereby selectively controlling each function.

It is possible to additionally coat the transparent protective layer 140 on an upper surface of the character layer 130 using a separate transparent material to improve durability of the printed character layer 130 as shown in FIG. 31.

The character layer 130 is provided above the light guide plate 40, and has a function of screening unnecessary light. Therefore, the character layer 130 uses a dark level color and absorbs light in the non-light-emission region excepting the character opening part 131. In other words, the character layer 130 has a partial influence on a light guide property of the light guide plate 40. The keypad and light guide plate integral type product has a design margin making it possible to get the light guide plate 40 thicker because it can achieve a great thin structure compared with a total thickness of the conventional keypad and light guide plate separated type product. In case where the light guide plate 40 is thick, the light guide efficiency increases on the whole and thus, light loss caused by the character layer 50 can be compensated to some degree. The reflection layer 101 provided on the upper surface of the light guide plate 40 has a function of minimizing an amount of light lost due to absorption or scatter outside the light guide plate 40.

A greater light efficiency can be obtained when the reflection layer 101 is additionally provided on the lower surface of the light guide plate 40 as shown in FIG. 32.

The light guide plate 40 should use material having the great refractive index and great transmittance with the same condition as that of the light guide plate 10 of the above described key backlighting back light unit. It is desirable that the refractive index has at least 1.5 or more. The light guide plate 40 should have a property that it is easily flexible when an external force is applied, and is elastically restored to an original state when the external force is not applied. As material satisfying all the above condition, there is polyurethane based material. In particular, it is suitable to use thermoplastic polyurethane (TPU).

The light guide plate 40 should have a proper thickness to obtain sufficient light guide efficiency. In the keypad and light guide plate separated type product, the light guide plate 40 is limited in thickness to 0.4 mm or less according to a limitation of a thin product design. However, the keypad and light guide plate integral type product can greatly enlarge a thickness of a light guide plate because it does not include the base resin layer 34 of the keypad of FIG. 1. A design margin of the thickness of the light guide plate increases about 0.5 mm to the maximum owing to the absence of the base resin layer 34. It could be appreciated by experiment that the thickness of the light guide plate 40 should be secured minimum 0.3 mm or more, and was available up to maximum 0.6 mm.

There occurs a problem that light does not smoothly encounter an end of the light guide plate 40, in case where the light guide plate 40 has a thickness of less than 0.3 mm, and there occurs a problem that an amount of guided light no longer increases though the light guide plate 40 has a thickness of more than 0.6 mm, in case where a 0.4 mm light emitting diode is used as a light emitting device. In detail, the light guide plate 40 should have a thickness of at least 0.3 mm or more to obtain a light guide effect throughout an area of the light guide plate 40, and should have a thickness of 0.6 mm or less to obtain a maximum slimness effect.

A light guide pattern part 150 can be additionally provided on the lower surface of the light guide plate 40 as shown in FIG. 33. A product requiring a great appearance needs an additional countermeasure because there occurs a luminance difference to some degree within the light guide plate 40, in case where the light guide pattern part 140 is not provided.

A work for separately controlling a transmittance can be also performed in such a manner that a high luminance region of a diffusion layer of a character layer 130 gets thick to reduce a luminance, thereby make the luminance uniform. This method is easily applicable because of relative low cost. However, this method achieves adjustment by reducing an entire luminance. A method of forming the light guide pattern part 150 as shown in FIG. 33 is desirable for an advanced product because it can be more accurate and can more minimize light loss.

The light guide pattern part 150 is formed on the lower surface of the light guide plate 40 to have an island shaped group with a predetermined regularity. The light guide pattern part 150 is formed to have engraving or embossing with predetermined shapes, e.g. dot, circle, straight line, dashed line, mesh patterned, and non-patterned shapes or a combination thereof. The island-like light guide pattern part 150 having a plurality of engraving or embossing is of a type of several required characters or keys. The light guide pattern part 150 is formed using printing, injection molding, extrusion, stamping, imprinting, ultrasonic processing, and laser processing methods.

In detail, the light guide pattern part 150 can be formed using various methods: the printing method using a mask having a light guide pattern formed by a separate ink, the injection molding method using a patterned metal mold, the stamping method using a heated stamp metal mold having a light guide pattern, the laser processing method where the light guide plate 10 is marked using a laser beam oscillated from a laser device, and the ultrasonic processing method using ultrasonic waves.

The light guide plate 40 has a drawback of light leakage that light guided from the light emitting unit 20 leaks outside its edge. The light leakage may deteriorate a product quality and cause a shortage of light within the light guide plate 40 because light unnecessarily leaks out from a non-light-emitting region after completion of product assembly. Thus, there occurs a drawback of requiring an additional light source.

In order to solve this, the present invention additionally provides an engraved light leakage prevention pattern 120 at an edge of a light guide plate 40 as shown in FIG. 34. An engraved groove of the light leakage prevention pattern 120 is additionally filled with opaque material 121, thereby preventing the light leakage.

A depth of the light leakage prevention pattern 120 should be set to 80% or more of a thickness of the light guide plate 40, and should be set to maximum 100% of the thickness of the light guide plate 40.

It is desirable that the light leakage prevention pattern 120 is of opaque material 121 to prevent transmittance. The opaque material 121 can be black material or white material. The opaque material 71 of black material can prevent only light leakage. The opaque material 71 of white material having high reflexibility can prevent light leakage and again reflect light within the light guide plate 40, thereby enhancing light efficiency at the same time.

The opaque material 121 filled in the engraved groove of the light leakage prevention pattern 120 uses black material when aiming at only perfect light leakage prevention. The opaque material 121 uses white material when aiming at all a light reflection effect and a light leakage prevention function.

The light leakage prevention pattern 120 can be disposed in a slant direction not -at right angles with a light source as shown in FIGS. 15 and 35 so that light travels in other directions not toward an edge, to obtain a light leakage prevention effect without opaque material. The non-use of the opaque material 121 results in additional omission of a manufacture process and thus, increases productivity and reduces a manufacture cost.

The light guide pattern part 150 is formed on a lower surface of the light guide plate 40. The light guide pattern part 150 includes a plurality of protrusion parts 152 each corresponding to the required characters, numerals, and symbols printed on the character layer 50.

The plurality of protrusion parts 150 press and more surely guarantee a connection of an underlying metal dome switch 24 with a switch contact part 23, when a corresponding key is pressed. The protrusion parts 150 can be formed by forming a separate material on the lower surface of the light guide plate 40 using a printing or adhering method. Alternately, the protrusion parts 43 can be integrally manufactured by shaping light guide plate material itself.

A plurality of metal domes can be installed on a lower surface of a protrusion part 121 or a light guide plate 40 to facilitate an assembly of a metal dome switch 24 and a PCB 22 as shown in FIGS. 38 and 39. Alternately, the metal domes 24 can be installed integrally with a keypad, using an adhesive, such that their centers are matched with the center of each key.

Accordingly, the present invention provides the keypad combination back light unit for the input device in which assembly is easy and productivity increases because of great light emission efficiency, possible ultra-slim design, and simple and convenient handling.

As described above, the back light unit according to the present invention using the transparent resin light guide plate having the flexibility and appropriate physical properties has an effect of providing a backlight applicable to a display needing the flexibility.

The back light unit according to the present invention has an effect of providing a solution to a problem of reduction of the transmittance caused by the thin flexible resin light guide plate, using an optimal design condition of providing an optimal light guide efficiency based on the physical properties such as an appropriate hardness of the light guide plate.

The back light unit according to the present invention has an effect of providing a solution to a problem of reduction of the transmittance caused by the backlighting light guide plate for the keypad, using an optimal design condition of providing an optimal light guide efficiency based on the physical properties such as an appropriate refractive index of the light guide plate.

As described above, the present invention can obtain the optimal light guide efficiency based on the physical properties such as the hardness and the refractive index of the light guide plate, and can provide the solution to the problem of reduction of the transmittance caused by the light guide plate, thereby reducing the material cost, and improving the productivity. The present invention can integrate the keypad and the back light unit and enable the slim design, thereby changing a direct type LED back light structure applied to a product such as the key backlighting back light unit for the input device such as a telephone or a mobile phone, into a side light guide type back light structure. Accordingly, the present invention can have effects of reduction of a manufacture cost resulting from reduction of the number of light sources, improvement of the design, and reduction of power consumption.

As described above, the present invention has an advantage of maximizing the light efficiency by including the light leakage prevention pattern and using the transparent resin light guide pattern.

The present invention has an effect that the light leakage prevention pattern, the reflection layer, and the front light guide pattern are of opaque material, thereby providing the optimal design condition of providing the optimal light guide efficiency. The present invention has an effect that the transparent protective layer is added to the upper surface of the keypad, thereby providing a solution to a problem of deteriorating a workability and increasing the manufacture cost due to the bending of the thin flexible resin light guide plate.

In particular, the keypad combination back light unit according to the present invention has an effect of reducing the assembly cost, improving the assembly productivity. The keypad combination back light unit can integrate the keypad and the back light unit and enable the slim design, thereby reducing the manufacture cost, improving the design, and reducing the power consumption.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A keypad combination back light unit in a keypad apparatus having a backlighting function, the back light unit comprising:
    a light guide plate having a light guide pattern part;
    at least one light emitting unit provided at a sidewall of the light guide plate, and irradiating light to the light guide plate;
    a character layer provided on an upper surface of the light guide plate;
    a transparent protective layer provided on an upper surface of the character layer, and having a greater hardness than the light guide plate and a smaller thickness than the light guide plate; and
    a light leakage prevention pattern provided at an edge of the light guide plate,
    wherein the light leakage prevention pattern reflects light irradiated from the light emitting unit and not encountering the light guide pattern part, and prevents light leakage outside the light guide plate.

2. The back light unit of claim 1, wherein the light leakage prevention pattern is provided with opaque material.

3. The back light unit of claim 2, wherein the opaque material is white in color.

4. The back light unit of claim 1, wherein a depth of the light leakage prevention pattern is equal to a thickness of the light guide plate.

5. The back light unit of claim 1, wherein the light leakage prevention pattern is of a shape in which a plurality of dashed lines are overlapped at their ends in parallel, respectively.

6. The back light unit of claim 5, wherein the light leakage prevention pattern is provided on a slant from the light emitting unit, and is not provided with opaque material.

7. The back light unit of claim 1, wherein the light emitting unit is comprised of at least one LED.

8. The back light unit of claim 1, wherein the light guide pattern part and the light leakage prevention pattern are formed by printing, injection, extrusion, pressing, imprinting, laser processing, or ultrasonic processing.

9. The back light unit of claim 8, wherein the light guide plate is of polyurethane.

10. The back light unit of claim 1, wherein the light guide pattern part and the light leakage prevention pattern are formed by printing, injection, extrusion, pressing, imprinting, laser processing, or ultrasonic processing.

11. The back light unit of claim 10, wherein the light guide plate is of polyurethane.

12. The back light unit of claim 1, wherein the transparent protective layer is of polycarbonate (PC), polyethylene (PE), polyethylene terephthalate (PET).

13. The back light unit of claim 1, wherein the transparent protective layer is formed by coating transparent material.

14. The back light unit of claim 1, wherein the light guide plate has a thickness of 0.3 mm to 0.6 mm.

15. The back light unit of claim 1, wherein the character layer comprises at least one of a display layer, a reflection layer, and a diffusion layer.

16. The back light unit of claim 15, wherein the reflection layer and the diffusion layer are white in color.

17. The back light unit of claim 1, wherein the light guide pattern part is formed to have embossing by printing white material.

18. The back light unit of claim 1, wherein the light guide pattern part is provided on an entire lower surface of the light guide plate by printing white material.

19. The back light unit of claim 18, wherein the light guide pattern part and the light leakage prevention pattern are provided integrally.

20. The back light unit of claim 1, wherein the light guide pattern part is provided on an entire lower surface of the light guide plate by printing white material.

21. The back light unit of claim 20, wherein the light guide pattern part and the light leakage prevention pattern are provided integrally.

22. The back light unit of claim 1, wherein the light guide pattern part is provided on a lower surface of the light guide plate covering a character opening region of the character layer, by printing white material.

23. The back light unit of claim 1, wherein the light guide plate has a protrusion part provided on its lower surface.

24. The back light unit of claim 1, wherein the light guide plate has a dome switch provided on its lower surface.

25. A key backlighting back light unit comprising:
a light guide plate having a light guide pattern part;
at least one light emitting unit provided at a sidewall of the light guide plate, and irradiating light to the light guide plate;
a key adhesion film positioned over the light guide plate, and having a resin layer, a character opening part having a character shape, and a key assembly provided at one side;
a printed circuit board having a metal dome switch positioned under a lower surface of the light guide plate; and
a light leakage prevention pattern provided at an edge of the light guide plate, and reflecting light irradiated from the light emitting unit and not encountering the light guide pattern part, and preventing light leakage outside the light guide plate.

26. The back light unit of claim 25, wherein the light guide pattern part is formed to have embossing by printing white material.

27. The back light unit of claim 25, wherein the light guide pattern part is provided on an entire lower surface of the light guide plate by printing white material.

28. The back light unit of claim 25, wherein the light guide pattern part and the light leakage prevention pattern are provided integrally.

29. The back light unit of claim 25, wherein the light guide pattern part is provided on a lower surface of the light guide plate covering a character opening region of the character layer, by printing white material.

30. A key backlighting back light unit for an input device, the back light unit comprising:
at least one light emitting unit provided at a sidewall of a light guide plate, and irradiating light to the light guide plate;
the light guide plate having flexibility, and having a minimum refractive index of 1.5 or more; and
a reflection layer provided without an air layer at at least one sides of an upper surface and a lower surface of the light guide plate.

31. The back light unit of claim 30, wherein the light emitting unit is comprised of at least one LED.

32. The back light unit of claim 30, wherein the light guide plate has a light guide pattern additionally provided on its lower surface.

33. The back light unit of claim 32, wherein the light guide pattern has a dot, circle, straight line, dashed line, or mesh shape, or a combination thereof.

34. The back light unit of claim 32, wherein the light guide pattern is formed by printing, injection, extrusion, pressing, imprinting, laser processing, or ultrasonic processing.

35. The back light unit of claim 30, wherein the light guide plate is of thermoplastic polyurethane (TPU)-based high transparent resin.

36. The back light unit of claim 30, wherein the light guide plate has a light leakage prevention pattern provided at its edge by engraving.

37. The back light unit of claim 36, wherein the light leakage prevention pattern has opaque material provided in its engraved groove.

38. The back light unit of claim 30, wherein protrusion parts are provided correspondingly to key positions on a lower surface of the light guide plate, and the protrusion parts are formed by printing.

39. The back light unit of claim 38, wherein a metal dome is provided at the protrusion part.

40. The back light unit of claim 30, wherein protrusion parts are provided correspondingly to key positions on a lower surface of the light guide plate, and the protrusion part is formed integrally with the light guide plate.

41. The back light unit of claim 40, wherein a metal dome is provided at the protrusion part.

42. The back light unit of claim 30, wherein the light guide plate has a metal dome provided on its lower surface.

43. A keypad combination back light unit having flexibility in a keypad apparatus, the back light unit comprising:
at least one light emitting unit provided at a sidewall of a light guide plate, and irradiating light to the light guide plate;
the light guide plate having a minimum refractive index of 1.5 or more;
a reflection layer provided without an air layer at at least one side of an upper surface or a lower surface of the light guide plate; and a character layer provided without an air layer on an upper surface of the reflection layer.

44. The back light unit of claim 43, wherein the light emitting unit is comprised of at least one LED.

45. The back light unit of claim 44, wherein the light guide pattern is formed by printing, injection, extrusion, pressing, imprinting, laser processing, or ultrasonic processing.

46. The back light unit of claim 44, wherein protrusion parts are provided correspondingly to key positions on a lower surface of the light guide plate, and the protrusion parts are formed by printing.

47. The back light unit of claim 46, wherein a metal dome is provided at the protrusion part.

48. The back light unit of claim 43, wherein the light guide plate has a light guide pattern additionally provided on its lower surface.

49. The back light unit of claim 48, wherein the light guide pattern has a dot, circle, straight line, dashed line, or mesh shape, or a combination thereof.

50. The back light unit of claim 43, wherein the light guide plate is of thermoplastic polyurethane (TPU)-based high transparent resin.

51. The back light unit of claim 43, wherein the light guide plate has a light leakage prevention pattern provided at its edge by engraving.

52. The back light unit of claim 51, wherein the light leakage prevention pattern has opaque material provided in its engraved groove.

53. The back light unit of claim 43, wherein protrusion parts are provided correspondingly to key positions on a lower surface of the light guide plate, and the protrusion part is formed integrally with the light guide plate.

54. The back light unit of claim 53, wherein a metal dome is provided at the protrusion part.

55. The back light unit of claim 43, wherein the light guide plate has a metal dome provided on its lower surface.

56. The back light unit of claim 43, wherein the character layer comprises at least one of a display layer, a color layer, and a diffusion layer.

57. The back light unit of claim 56, wherein the display layer is of metal or plastic.

58. The back light unit of claim 57, wherein the display layer is formed not to have an air layer, by an adhesive or fusion for integration.

59. The back light unit of claim 43, wherein transparent material having a greater hardness than the light guide plate is provided on a surface of the character layer to complement a durability and a hardness.

60. The back light unit of claim 43, wherein the light guide plate has a thickness of 0.3 mm to 0.6 mm.

61. The back light unit of claim 43, wherein the reflection layer is white in color.

* * * * *